(12) United States Patent
Baxter et al.

(10) Patent No.: US 11,910,786 B2
(45) Date of Patent: Feb. 27, 2024

(54) AUTOMATED FOOD DISPENSER

(71) Applicant: Automated Pet Care Products, LLC, Auburn Hills, MI (US)

(72) Inventors: Brad Baxter, Bloomfield Hills, MI (US); Jason Smith, West Bloomfield, MI (US); Jason Weihman, Troy, MI (US)

(73) Assignee: AUTOMATED PET CARE PRODUCTS, LLC, Auburn Hills, MI (US)

( * ) Notice: Subject to any disclaimer, the term of this patent is extended or adjusted under 35 U.S.C. 154(b) by 58 days.

(21) Appl. No.: 17/565,637

(22) Filed: Dec. 30, 2021

(65) Prior Publication Data

US 2022/0117195 A1 Apr. 21, 2022

Related U.S. Application Data

(63) Continuation of application No. 17/278,099, filed as application No. PCT/US2019/051927 on Sep. 19, 2019, now Pat. No. 11,224,202.
(Continued)

(51) Int. Cl.
*A01K 5/02* (2006.01)
(52) U.S. Cl.
CPC .......... *A01K 5/0275* (2013.01); *A01K 5/0225* (2013.01)
(58) Field of Classification Search
CPC ............................ A01K 5/0275; A01K 5/0225
See application file for complete search history.

(56) References Cited

U.S. PATENT DOCUMENTS

| 852,603 A | 5/1907 | Hanlon |
|---|---|---|
| 1,022,774 A | 4/1912 | Julio |

(Continued)

FOREIGN PATENT DOCUMENTS

| CH | 329278 A | 4/1958 |
|---|---|---|
| CN | 201029358 Y | 3/2008 |

(Continued)

OTHER PUBLICATIONS

JP Notification of Reasons for Refusal dated May 16, 2022, Application No. 2021-514977.
(Continued)

*Primary Examiner* — Yvonne R Abbott-Lewis
(74) *Attorney, Agent, or Firm* — The Dobrusin Law Firm, P.C.; Daniela M. Thompson-Walters

(57) ABSTRACT

A feeder including: a) a base portion having a serving area; b) a chamber portion supported by the base portion and configured to retain a granular material within a chamber interior; c) a dispenser configured to segregate a portion of the granular material from the chamber interior and transfer the portion of the granular material from the chamber portion to the serving area, wherein the dispenser includes: i) a rocker body; and ii) one or more fins projecting from the rocker body; and wherein the feeder includes one or more of: i) the fin(s) are flexible; ii) sensing device(s) part of a sensing tower configured to sense the presence, distance, and/or amount of the granular material within the chamber portion; and/or iii) sensing device(s) configured to sense the presence, distance, and/or amount of the granular material within the serving area.

20 Claims, 8 Drawing Sheets

Related U.S. Application Data

(60) Provisional application No. 62/733,811, filed on Sep. 20, 2018.

(56) References Cited

U.S. PATENT DOCUMENTS

| | | | |
|---|---|---|---|
| 2,042,455 A | 6/1936 | Barrott | |
| 2,475,381 A | 7/1949 | Erickson | |
| 2,575,967 A | 11/1951 | May | |
| 2,791,984 A | 5/1957 | Robert | |
| 2,869,638 A | 1/1959 | Sullivan | |
| 2,920,796 A | 1/1960 | Field | |
| 3,033,164 A | 5/1962 | Evers | |
| 3,034,688 A * | 5/1962 | Rudd | A01K 5/0275 222/359 |
| 3,169,675 A | 2/1965 | Gutzmann et al. | |
| 3,645,422 A | 2/1972 | Cretors | |
| 3,894,660 A | 7/1975 | Snyder | |
| 4,000,719 A * | 1/1977 | Richards | A01K 5/0291 119/51.13 |
| 4,055,146 A | 10/1977 | Smrt | |
| 4,249,483 A | 2/1981 | Sobky | |
| 4,268,205 A | 5/1981 | Vacca | |
| 4,279,220 A | 7/1981 | Kukurba | |
| 4,485,765 A | 12/1984 | Schwartz | |
| 4,511,067 A | 4/1985 | Martin | |
| 4,770,125 A | 9/1988 | Gold et al. | |
| 4,957,219 A | 9/1990 | Robbins et al. | |
| 5,052,288 A | 10/1991 | Marquez et al. | |
| 5,054,657 A | 10/1991 | Morse et al. | |
| 5,259,533 A | 11/1993 | Kornfein et al. | |
| 5,303,672 A | 4/1994 | Morris | |
| 5,908,007 A | 6/1999 | Duin | |
| 5,927,558 A | 7/1999 | Bruce | |
| 5,957,082 A | 9/1999 | Budman et al. | |
| 6,029,828 A | 2/2000 | Robbins et al. | |
| 6,234,111 B1 | 5/2001 | Ulman et al. | |
| 6,467,431 B1 | 10/2002 | Stietzel | |
| 6,789,503 B1 | 9/2004 | Gao | |
| D500,636 S | 1/2005 | Levy et al. | |
| 6,845,735 B1 | 1/2005 | Northrop | |
| D507,936 S | 8/2005 | Gold et al. | |
| 6,964,355 B2 | 11/2005 | Landau | |
| 7,111,581 B2 | 9/2006 | Kubala et al. | |
| D531,457 S | 11/2006 | Gold et al. | |
| 7,426,901 B2 | 9/2008 | Turner et al. | |
| 7,597,219 B2 | 10/2009 | O'Leary et al. | |
| 7,703,639 B2 | 4/2010 | Landau | |
| 7,731,063 B2 | 6/2010 | Rusch | |
| 8,100,084 B1 | 1/2012 | Abramson | |
| 8,161,911 B2 | 4/2012 | Jalbert et al. | |
| 8,534,507 B2 | 9/2013 | Gronholm | |
| 8,701,595 B2 | 4/2014 | Jin et al. | |
| 8,776,725 B1 | 7/2014 | Grijalva | |
| 8,905,272 B2 | 12/2014 | Chan et al. | |
| 9,161,514 B2 * | 10/2015 | Baxter | A01K 5/0275 |
| 9,192,142 B2 | 11/2015 | Jackson et al. | |
| 11,076,578 B2 | 8/2021 | Luttrell | |
| 2002/0096120 A1 * | 7/2002 | Busha | A01K 7/02 119/51.5 |
| 2003/0084853 A1 | 5/2003 | Voogd | |
| 2004/0129229 A1 | 7/2004 | Blais et al. | |
| 2005/0252457 A1 | 11/2005 | Morosin et al. | |
| 2009/0126639 A1 | 5/2009 | Hsieh | |
| 2010/0147226 A1 | 6/2010 | Tsengas | |
| 2010/0263596 A1 | 10/2010 | Schumann et al. | |
| 2012/0234248 A1 * | 9/2012 | Lytle | A01K 5/0233 119/54 |
| 2014/0060441 A1 * | 3/2014 | Baxter | A01K 5/0275 119/61.5 |
| 2015/0327514 A1 | 11/2015 | Clark et al. | |
| 2015/0342143 A1 | 12/2015 | Stewart | |
| 2016/0029592 A1 | 2/2016 | Springer et al. | |
| 2017/0199982 A1 | 7/2017 | Brockway | |

FOREIGN PATENT DOCUMENTS

| | | |
|---|---|---|
| CN | 107950415 A | 4/2018 |
| CN | 108271706 A | 7/2018 |
| CN | 207707043 U | 8/2018 |
| DE | 3500348 A1 | 7/1986 |
| DE | 4242188 A1 | 6/1994 |
| FR | 1413881 A | 10/1965 |
| JP | S52-001680 | 1/1977 |
| JP | 2001045902 A | 2/2001 |
| JP | 2016-000021 A | 1/2016 |
| JP | 2018-514217 A | 6/2018 |

OTHER PUBLICATIONS

CA Office Action dated May 25, 2022, Application No. 3,113,249.

Chinese Notification of Completion for Formalities of Registration, Notification of Decision to Grant Patent Right, and Search Report dated Jan. 10, 2023, Application No. 201980062082.3.

Chinese Office Action dated Jan. 26, 2022, Application No. 201980062082.3.

Key Technologies of Modern Animal Husbandry Informatization (1st Edition), Lei Xi, et al., pp. 165-166, Central Plains Farmers Published House.

Healthy Pig Raising Engineering Technology Model—Technology and Equipment of House Feeding and Free-range Raising (1st Edition), Zhengxian Shi et al., p. 98, China Agricultural University Press.

International Search Report and Written Opinion dated Dec. 9, 2019, Application No. PCT/US2019/051927.

Notification of Transmittal of International Preliminary Report on Patentability dated May 12, 2020, Application No. PCT/US2019/051927.

* cited by examiner

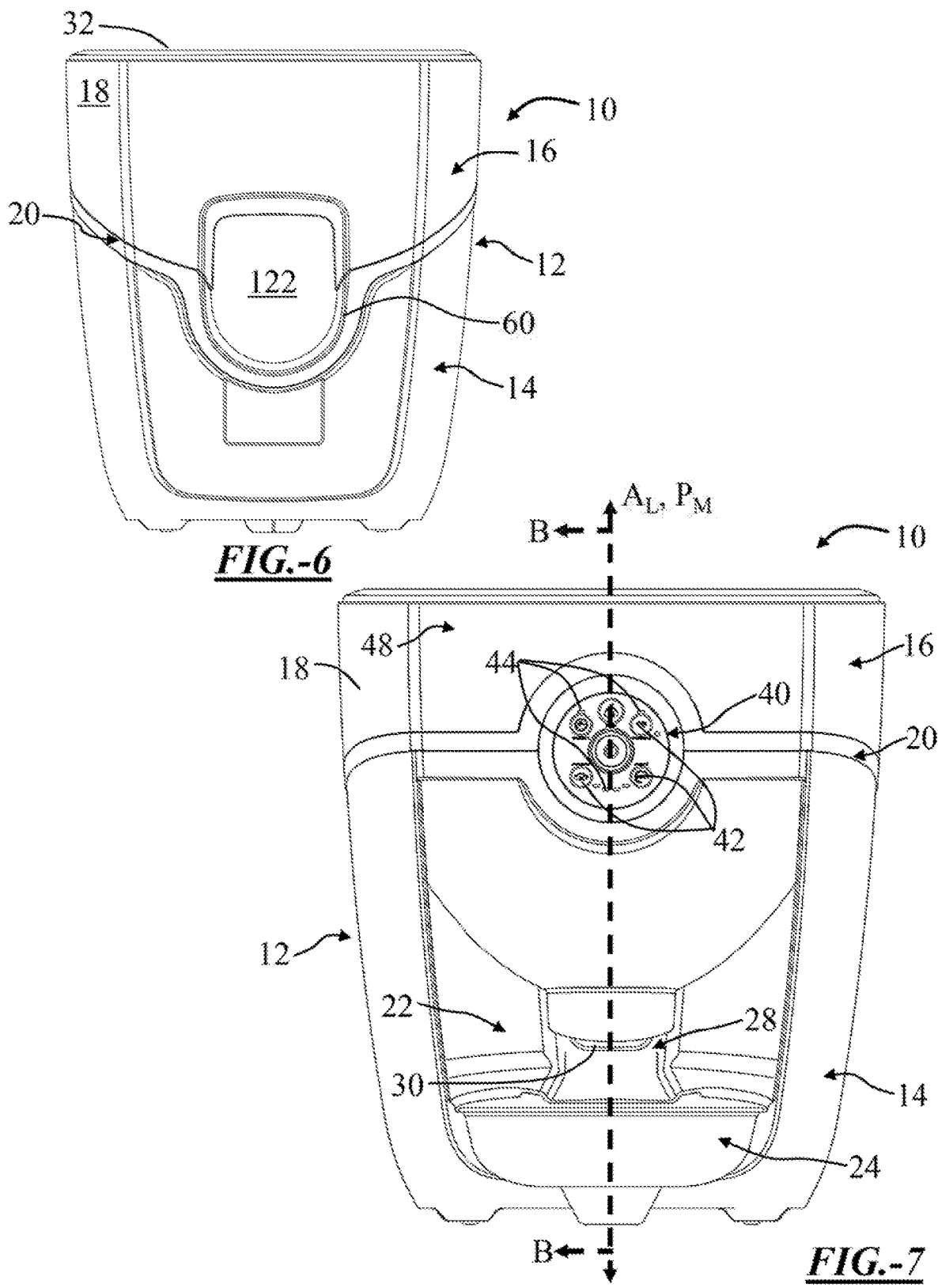

AUTOMATED FOOD DISPENSER

CROSS REFERENCE TO RELATED APPLICATIONS

Applicant claims the benefit of US Provisional Application No.: 62/733,811 filed on Sep. 20, 2018, the contents of which are incorporated herein by reference in its entirety.

FIELD

The present teachings generally relate to a feeder which is able to store an overall quantity of food and dispense a predetermined and consistent amount of food. The feeder may be particularly suitable for feeding one or more animals, such as a household pet.

BACKGROUND

Food dispensers with rotary dispenser wheels are known to be used for dispensing food with a predetermined serving size. These food dispensers generally have a hopper in fluid communication with the rotary dispenser wheel. The rotary dispenser wheel typically has a core surrounded by a plurality of fins or vanes. The distance between the fins or vanes may comprise a serving size of the food to be dispensed. The fins or vanes function to both prevent food from being dispensed and moving food to be dispensed from the hopper. Exemplary food dispensers are disclosed in U.S. Pat. Nos. 6,964,355 and 7,597,219, which are incorporated herein by reference in their entirety.

One challenge associated with such food dispensers with rotary dispenser wheels is that they are not generally used for feeding of domestic animals. These types of dispensers may be used for dry foods, like cereals, by humans and the rotary dispenser wheel may be rotated by a manual knob. A human may place a bowl or plate underneath the rotary dispenser wheel and manually turn the rotary dispenser wheel to dispense food from the hopper. Another challenge presented by the rotary dispenser wheel is that the plurality of fins or vanes surrounding a core present a plurality of components which may break or become jammed with food. Additionally, some of these food dispensers do not have integrated feeding areas useful by animals, and incorporating a feeding area may provide a food dispenser which is too bulky for practical use in a home.

What is needed is a feeder useful by domesticated animals. It would be attractive to have a feeder which stores a plurality of servings of food. It would be attractive to have a feeder which is a multi-day feeder. What is needed is an automated feeder which dispenses food at predetermined quantities, predetermined time intervals, predetermined food levels, or a combination thereof. What is needed is feeder which automatically dispenses food from within an interior to a serving area. What is needed is a feeder which is able to monitor the levels of food located within an interior, within a serving area, or both. What is needed is a feeder which is able to alert a user of one or more statuses of the feeder, food, animal, or a combination thereof. What is needed is a dispenser of a feeder which reduces the chance of jamming. It would be attractive to have a feeder which is large enough to provide feeding space for an animal while also being small enough to be located in a small area of a home, including a counter top.

SUMMARY

The present disclosure relates to a feeder comprising: a) a base portion having a serving area; b) a chamber portion supported by the base portion and configured to retain a granular material within a chamber interior; c) a dispenser configured to segregate a portion of the granular material from the chamber interior and transfer the portion of the granular material from the chamber portion to the serving area, wherein the dispenser includes: i) a rocker body configured to partially rotate about a rotational axis; and ii) one or more fins projecting from the rocker body, wherein a distance between the rocker body and the one or more fins is adapted to receive the portion of the granular material.

The feeder of the disclosure may include one or more of the following features in any combination: i) the one or more fins are flexible along a length of the one or more fins; ii) one or more sensing devices are part of a sensing tower which at least partially extends through the chamber portion, and wherein the one or more sensing devices are configured to sense the presence, distance, and/or amount of the granular material within the chamber portion; and/or iii) one or more chute sensing devices configured to sense the presence, distance, and/or amount of the granular material within the serving area.

The disclosure also relates to a method of dispensing food with the feeder according to the teachings herein.

The present teachings may provide a feeder useful by domesticated animals. The feeder may include a chamber portion having a hopper capable of storing multiple days' worth of servings of food. The feeder may include a dispenser having a rocker body and one or more fins. One or more serving cavities forming a serving size of food to be dispensed may be determined by the distance between one or more surfaces of the rocker body and a fin. The dispenser may have a single fin. The fin may be flexible along its length which may aid in unjamming and preventing jamming of the fin, rocker body, food, or a combination thereof. The dispenser may rock back and forth between two dispensing positions and a single resting position, as opposed to rotating completely about a rotational axis. The limited rotation of the dispenser may aid in preventing jamming of food, the fin, or both in the dispenser cradle, the chute, or both. The feeder may include a plurality of sensors. The sensors may sense the presence, distance, amount, or a combination thereof of food within a hopper, chute, serving area, or a combination thereof. Based on a signal detected from one or more sensors, a dispenser may dispense food or may be restricted from dispensing food. Based on a signal detected by one or more sensors, one or more status indicators may inform a user of a condition of the feeder. Additionally, the feeder may generally have a serving area located underneath the hopper and integrated into the housing such that the feeder is compact enough for residential space while large enough to be comfortable for use by an animal.

BRIEF DESCRIPTION OF DRAWINGS

FIG. 6 is a rear elevation view of a feeder according to the teachings herein.

FIG. 7 is a front elevation view of a feeder according to the teachings herein.

DETAILED DESCRIPTION

Figure 1:
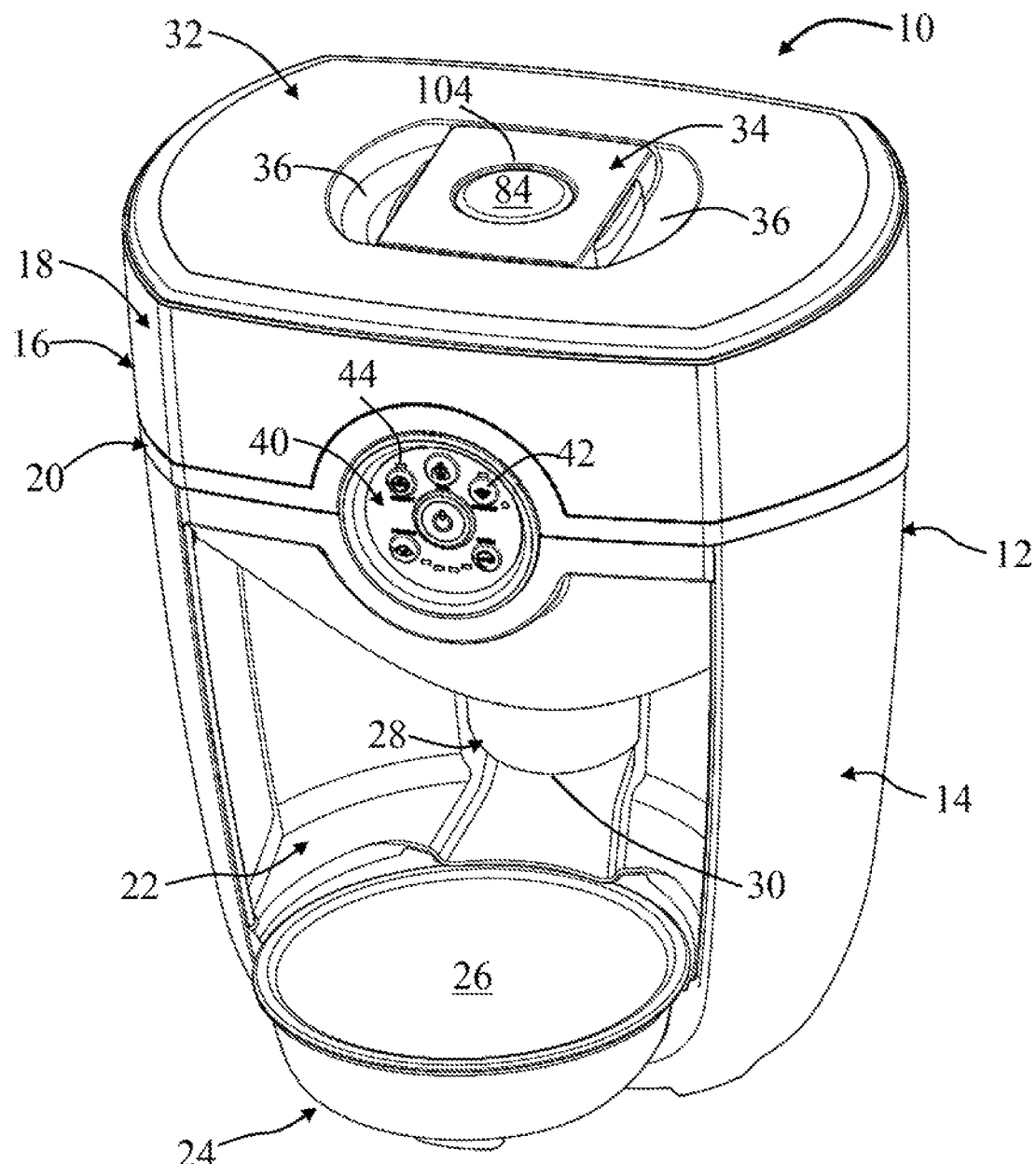
FIG. 1 is a front perspective view of a feeder according to the teachings herein.

The explanations and illustrations presented herein are intended to acquaint others skilled in the art with the present teachings, its principles, and its practical application. The specific embodiments of the present teachings as set forth are not intended as being exhaustive or limiting of the present teachings. The scope of the present teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The feeder may be any device that includes and dispenses food for consumption by an animal. Food may include any type of food suitable for consumption by an animal. Food may include solid food, semi-solid food, liquid, the like, or a combination thereof. Solid food may be in the form of granular material. The animal may be any domestic animal. A domestic animal may include a dog, cat, pig, rabbit, hamster, guinea pig, ferret, the like, or any combination thereof. In a typical pet-owning household, the domestic animal may include one or more cats, dogs, or both. The feeder may include one or more of the following features: a housing, base portion, chamber portion, hopper, intermediate portion, feeding cavity, serving area, feeding dish, a chute, a cover, one or more handles, a control panel, a dispenser, one or more sensors, a sensing tower, drive source, a power source, or any combination thereof. The feeder may include a base portion, chamber portion supported by the base portion, and a dispenser. The feeder may have a front opposing a rear. The front of the feeder may be the side of the feeder in which a feeding cavity is exposed. The feeder may have a top opposing a bottom. The bottom of the feeder may be the portion of the feeder which rests on a surface during normal use of the feeder.

The feeder may include a housing. The housing may function to house one or more components of the feeder, store food within the feeder, provide a serving area in the feeder, or any combination thereof. The housing may include a base portion, intermediate portion, chamber portion, or a combination thereof. The housing may be a single, unitary piece, or a plurality of pieces assembled together. For example, the base portion may be molded with a piece of the intermediate portion or may be attached thereto. The housing may include a chamber portion adjacent and affixed to an intermediate portion. The housing may include an intermediate portion adjacent to and affixed to a base portion.

The housing may have a longitudinal axis extending therethrough. The longitudinal axis may extend from a bottom through a top (e.g., cover) of the feeder. The longitudinal axis may be centered or off-centered relative to a sensing tower, opening in a cover, handle in a cover, or any combination thereof. The longitudinal axis may lie within and/or be parallel to a median plane. The housing may be substantially symmetrical or asymmetrical relative to the median plane. Substantially and/or generally may mean within a tolerance of about 1 degree, about 5 degrees, or even about 10 degrees. Substantially and/or generally may mean within about +/−1% or greater, about +/−5% or greater, or even about +/−10% or greater. The median plane may divide the housing and/or feeder in half, between a left and a right side. Substantially perpendicular to the median plane is a transverse plane. The transverse plane may also have the longitudinal axis lying therein and/or parallel thereto. The transverse plane may intersect the median plane at or be distanced from the longitudinal axis. The transverse plane may divide the housing and/or the feeder between a front and rear.

The feeder may include a base portion. The base portion may function to support a chamber portion and/or intermediate portion, provide a serving area, retain a feeding dish, house one or more power sources and/or drive sources, or any combination thereof. The base portion may be located adjacent to a chamber portion, intermediate portion, or both. The base portion may be located below the chamber portion, intermediate portion, or both. The base portion may have a shape suitable for forming a feeding cavity and allowing an animal at least partial access into the feeding cavity. The base portion may be formed by an inner shell, outer shell, a serving area, or a combination thereof. The base portion may be substantially hollow to provide access to the feeding cavity. The base portion may have a shape which is generally cubical, cylindrical, spherical, conical, cubical, prismed, cuboidal, the like, or any combination thereof. The base portion may have a generally cuboidal shape. The base portion may have one or more side walls, bottom wall, upper wall, any combination thereof. The base portion may have one or more, two or more, three or more, or even four or more side walls. The base portion may have a bottom wall connecting one or more side walls. The base portion may have a substantially cuboidal shape with only three side walls and a bottom wall. The absence of a wall may provide access into the feeding cavity. The three walls may be located at two or more sides and a rear of the feeder. The absence of a wall may be located at a front of the feeder. The two opposing side walls and bottom wall may form a cross-section which is substantially U-shaped. The cross-section may be taken parallel to a transverse plane of the feeder. The base portion may be formed of one unitary piece or separate pieces. The base portion may include an outer shell. The outer shell may function as the exterior of the base portion. The base portion may include an inner shell. The inner shell may serve as an interior of the base portion. The outer shell may have a shape substantially reciprocal with and similar to the inner shell. The inner shell may nest inside of the outer shell. The inner shell may rest at a bottom of the outer shell.

The base portion may include a bottom of the feeder. The bottom of the feeder may be suitable for resting the feeder on a surface. The bottom of the feeder may be located opposite a top of the feeder, opposite a cover of the feeder, or both. The surface for resting the feeder may include a floor, table, counter, or any other surface accessible by an animal and suitable for feeding. A bottom of the feeder may be generally planar. A generally planar bottom may be suitable for resting the bottom directly on a surface. The bottom of the feeder may include a plurality of feet. The plurality of feet may project away from the bottom, in a direction substantially parallel with a longitudinal axis, away from a top of the feeder, away from a bottom wall of the base portion, or any combination thereof. A plurality of feet may include two or more feet, three or more feet, four or more feet, or even five or more feet. A plurality of feet may be spaced about the bottom of the feeder. The plurality of feet may be spaced near the periphery of the bottom. The plurality of feet may be uniformly or non-uniformly spaced about a bottom opening and/or bottom cap of the base portion. The plurality of feet may be integral with or affixed to the base portion, outer shell, or both. The bottom of the feeder may include on or more non-slip surfaces. For example, if the bottom is generally planar, the bottom may include a plurality of small rubber pads affixed thereto. As another example, each of the feet may include a non-slip material (e.g., rubber) located thereon.

The base portion may include a base receptacle. The base receptacle may function to house one or more power sources, communication modules, electrical connections, or a combination thereof. The base receptacle may be located in any portion of the housing suitable for housing the power sources, communication modules, electrical connections, or a combination thereof. The base receptacle may have any suitable size and shape. The base receptacle may be located in a base portion, intermediate portion, chamber portion, or a combination thereof. The base receptacle may be located in the bottom of the base portion. Being located in the bottom may provide ease of access while also concealing the base receptacle during normal use of the feeder. The base receptacle may be located below a feeding cavity, serving area, chute, chute wall, or a combination thereof. The base receptacle may be accessed by a bottom opening. A bottom opening may allow for changing of one or more power sources (e.g., batteries), accessing one or more power sources for an electrical connection (e.g., AC adapter), or both. The bottom opening may be formed in the bottom of the base portion. The bottom opening may be located within a periphery of the bottom. The bottom opening may be covered by a bottom cap. The bottom cap may function to restrict access into the base receptacle, protect any components housed within the base receptacle, or both. For example, the bottom cap may prevent dust, liquid, and other contaminants from entering into the base receptacle. The bottom cap may be secured to the bottom of the base portion by one or more fastening mechanisms. One or more fastening mechanisms may include one or more threaded fasteners, tabs, snaps, the like, or any combination thereof. The base receptacle, bottom cap, bottom opening, and/or a combination thereof may be located opposite of a feeding cavity.

The feeder may include a feeding cavity. The feeding cavity may function to house a serving area, feeding dish, or both; provide space for a chute to dispense food into a serving area, feeding dish, or both; provide space for an animal to consume food; or any combination thereof. The feeding cavity may be formed in a gap in the housing. The feeding cavity may be formed by a gap between a chamber portion and base portion. The feeding cavity may be formed between an intermediate portion and a base portion. For example, the feeding cavity may be formed in a gap between a lower shell of an intermediate portion and a serving area of a base portion. The feeding cavity may be formed as an opening in a front, rear, side, or a combination thereof of the feeder. For example, the feeding cavity may be formed as an opening on a front of the housing extending toward the rear of the feeder but not passing completely through. The feeding cavity may include a feeding dish therein. The feeding cavity may have any suitable size in which the head of an animal may at least partially enter into the feeding cavity and have access to food within a serving area, feeding dish, or both for consumption. The feeding cavity may have a width which minimizes or prevents contact between whiskers of an animal and surfaces of a housing while the animal is consuming the food. The feeding cavity may have a width of about 75 mm or greater, about 125 mm or greater, or even about 200 mm or greater. The feeding cavity may have a width of about 1,500 mm or less, about 1,000 mm or less, about 500 mm or less, or even about 250 mm or less. The width of a feeding cavity may be measured as the distance between opposing side walls of the base portion (e.g., opposing side walls of an inner shell).

The feeder may comprise a serving area. The serving area may function to guide food toward a feeding dish, retain a feeding dish, provide food in an accessible manner for an animal to consume, or any combination thereof. The serving area may be formed by any portion of the housing suitable for having a feeding dish located thereon and accessible by an animal. The serving area may be formed by one or more portions of the housing. The serving area may be formed in the base portion. The serving area may be formed by a plurality of portions of a base portion. The serving area may be comprised of a serving wall, an outer dish, or both. One portion of a serving wall may function to funnel food from a chute toward a feeding dish. Another portion may function to retain a feeding dish, receive food from a serving wall and/or chute, provide an area for consumption of the food, or a combination thereof. The serving wall may be located adjacent to the outer dish, between an outer dish and a chute, integrated with the outer dish, or a combination thereof. The serving wall may be integrally formed with the outer dish portion. The serving wall may be formed to extend over at least a portion of the outer dish. A serving wall of a serving area may serve as an extension of a chute, may have a sloped design, or both. An outer dish portion may have a shape reciprocal with a feeding dish. An outer dish portion may function to retain the feeding dish and allow for removal of the feeding dish (i.e., removal for washing of the dish). An outer dish portion may be bowl-shaped. Bowl-shaped may mean having a substantially cylindrical outer wall projecting from a dish base wall which opposes an open end. The serving area may be positioned such as to aid in the delivery of food into a feeding dish from a chute, toward a front area of a feeding dish, or both. One or more portions of the serving area may be tilted at an angle toward a front of the feeder, relative to a longitudinal axis, relative to a transverse plane, or a combination thereof. The angle of the serving area may be any angle suitable for helping guide food toward a front of the serving area. The angle may be about 90 degrees or greater, 95 degrees or greater, or even about 100 degrees or greater relative to the longitudinal axis, transverse plane, or both of the feeder. The angle may be about 150 degrees or less, about 140 degrees or less, about 130 degrees or less, or even about 120 degrees or less relative to the longitudinal axis, transverse plane, or both of the feeder. The angle may be the angle formed between an upward facing surface (e.g., serving wall, dish base wall) of a portion of the serving area and the longitudinal axis, transverse plane, or both. The angle may be the angle facing toward a front of the feeder. One or more portions of a serving area may be angled at a same, steeper or more gradual angle than one or more other portions of a serving area or a chute. For example, an outer dish for a serving area may be angled about 90 degrees to about 100 degrees relative to a transverse plane and sloping downward toward a front of the feeder while a serving wall of a serving area may be angled about 110 degrees to about 130 degrees relative to a transverse plane and sloping downward toward a front of the feeder. The serving area may at least partially project beyond a portion of a surface of the housing or may be located entirely within the housing. The serving area may project beyond a front, rear, side, or a combination thereof of the housing. The serving area may project outside of an opening of an inner shell, outer shell, or both of the base portion.

The feeder may include a feeding dish. The feeding dish may function to retain dispensed food from the chamber portion, hopper, dispenser, chute, or a combination thereof allow access to an animal to consume the food within the dish; provide a removable feeding surface; or any combination thereof. The feeding dish may be located in a front, rear, side, or a combination thereof of a feeder. The feeding dish may have a shape suitable for having an animal consume food therefrom. The feeding dish may have a shape suitable for resting on and/or within the serving area, outer dish, or both. The feeding dish may have a shape at least partially reciprocal with an outer dish of the base portion. The feeding dish may nest within an outer dish of a serving area. The feeding dish may have a shape which is substantially cylindrical, conical, cubical, cuboid, the like, or a combination thereof. The feeding dish may be substantially bowl-shaped. The feeding dish may be located within the housing, project beyond the housing, or both. For an example, the feeding dish may at least partially project beyond a front of the housing, base portion, or both to allow ease of access by an animal. The feeding dish may be angled to help tilt food forward in the feeding dish, to avoid build-up of food at a rear of the feeding dish, or both. The angle of the feeding dish may be about 90 degrees or greater, 95 degrees or greater, or even about 100 degrees or greater relative to the longitudinal axis, transverse plane, or both of the feeder. The angle may be about 130 degrees or less, about 120 degrees or less, or even about 110 degrees or less relative to the longitudinal axis, transverse plane, or both of the feeder. The angle may be the angle formed between an upward facing surface (e.g., upon which the food lies on) of the feeding dish and the transverse plane. The feeding dish may have a lid affixed thereto. The lid may prevent access to the feeding dish, allow access to the feeding dish, or both. The lid may be moveably affixed to any portion of the feeder to cover the feeding dish and be removable from the feeding dish. The lid may be affixed to the feeder by a hinge, spring, linear actuator, the like, or a combination thereof. The lid may be in communication with a drive source. The drive source may be the same or different which drives the drive shaft and dispenser of the feeder. The drive source may be activated to open the lid, close the lid, or both. The lid may be in communication with one or more sensing devices, selection interfaces, or both. Activation of a selection interface may open the lid, close the lid, or both. Activation of a selection interface may be completed by a user (e.g., human). Detection of a trigger device by a sensing device may open the lid, close the lid, or both. A trigger device may be a tag, a barcode, another sensor, or the like. A trigger device may be wearable by an animal. For example, a tag may be affixed to a collar of an animal. The trigger device and the sensing device may use Bluetooth, wi-fi, radio frequency, or the like to communicate with one another.

The feeder may include a chamber portion. The chamber portion may be configured to retain food within a chamber interior, cooperate with a dispenser and/or intermediate portion to dispense food into a serving area, or both. The chamber portion may be located adjacent to an intermediate portion, base portion, or both. The chamber portion may be located above an intermediate portion, base portion, or both. Being located above the intermediate portion, base portion, or both may allow for gravity to aid in movement of food from the chamber portion to a serving area. The chamber portion may rest atop a base portion, upper shell, or both. The chamber portion may be supported by the base portion. The chamber portion may include a hopper, a cover, a dispenser cover, one or more openings, or a combination thereof.

The chamber portion may include a hopper. The hopper may function to retain food, retain a plurality of servings of food, guide food toward a dispenser, or any combination thereof. The hopper may have any suitable shape for retaining a plurality of servings of food, guiding food toward a dispenser, allowing access by one or more sensors and/or a sensor tower, or any combination thereof. The hopper may have a shape which is generally cubical, cylindrical, spherical, conical, cubical, prismed, cuboidal, the like, or any combination thereof. For example, the hopper may have a shape resembling a trapezoidal prism. The hopper may include a single or a plurality of side walls. The one or more side walls may project from a bottom wall of the hopper toward a top of the feeder, open end of the hopper, toward a cover, or a combination thereof. A bottom wall of the hopper may be generally planar, sloped, or a combination thereof. A bottom wall of the hopper may be funnel-shaped. A bottom wall of the hopper may be sloped toward a sensing tower, a hopper opening, a dispenser cradle, a dispenser, or any combination thereof. The bottom wall of the hopper may be sloped toward a sensing tower and continue to slope toward a dispenser cradle. The bottom wall may slope downward away from the front of the feeder, side walls of the feeder, or both to the rear of the feeder. The bottom wall may slope at any angle suitable for funneling food in the hopper toward the dispenser cradle. The bottom wall may slope at an obtuse angle relative to a longitudinal axis, transverse plane, or both. The bottom wall may slope at an angle of about 100 degrees or greater, about 110 degrees or greater, or even about 120 degrees or greater relative to a transverse plane, longitudinal axis, or both. The bottom wall may slope at an angle of about 150 degrees or less, about 140 degrees or less, or even about 130 degrees or less relative to a transverse plane, longitudinal axis, or both. The angle may be an angle facing toward a rear of the feeder. The bottom wall may have a shape substantially reciprocal with an adjacent surface of an intermediate portion. The bottom wall may have a shape substantially reciprocal with an upper shell of an intermediate portion. The bottom wall may rest on the upper shell of the intermediate portion. The bottom wall may include a hopper opening formed therethrough. The hopper opening may function to receive a sensor tower. The hopper opening may be centered with a sensor tower, longitudinal axis, cover, cover opening, or a combination thereof. The hopper opening may allow the hopper to be placed over the sensor tower, removed from the sensor tower, placed on top of the intermediate portion, or a combination thereof. When the hopper is located on the intermediate portion, the conical portion of a sensor tower may be located within the hopper opening.

One or more side walls and the bottom wall may define a hollow interior of the hopper. The hollow interior may serve as the area which receives and retains food for storage prior to dispensing into a serving area. The hollow interior may be defined by one or more bottom walls, side walls, or a combination of both. The hollow interior may be defined by the volume between a bottom wall, side walls, and a cover of the chamber portion. The volume of the hollow interior may be any volume suitable for holding multiple servings of food, preferably multiple days' worth of food. The volume of the hollow interior may be about 5 cups or greater, about 7 cups or greater, or even about 10 cups or greater. The volume of the hollow interior may be about 50 cups or less, about 40 cups or less, or even about 30 cups or less. The hollow interior may have a sensor tower located therein. The hollow interior may be in fluid communication with a dispenser cradle. The bottom wall may include a dispenser opening. The dispenser opening may be located in proximity to, fluid communication with, or adjacent to a dispenser cradle. The dispenser opening may be located substantially above a dispenser cradle. A dispenser opening may be located between a sensing tower and a rear of a hopper. A dispenser opening may allow food located within the hopper to transfer into a dispenser cradle, dispenser, or both. The dispenser opening may be located adjacent to a dispenser cover.

The chamber portion may include a dispenser cover. The dispenser cover may function to cover a dispenser cradle. The dispenser cover may be formed as part of or affixed to any portion of the housing suitable for covering a dispenser cradle. The dispenser cover may be affixed to both an intermediate portion and a chamber portion. The dispenser cover may be attached via one or more fasteners, a snap fit, an adhesive, the like, or any combination thereof. The dispenser cover may be integral with one or more portions of the housing. For example, the dispenser cover may be integrally formed as part of the hopper. The dispenser cover may be located on any portion of the hopper which is located in proximity to the dispenser cradle. The dispenser cover may be located adjacent to a dispenser opening of the hopper. The dispenser cover may be located on the same side of the feeder as the dispenser cradle. The dispenser cover may be located on a rear of the hopper. The dispenser cover may project downward from a side wall, the bottom wall, or both at the rear of the hopper. The dispenser cover may have a shape substantially reciprocal with or similar to a cross-section of a dispenser cradle. A cross-section of the dispenser cover may be circular, square, triangular, elliptical, half-moon shaped, the like, or a combination thereof. For example, a cross-section of the dispenser may be a half-moon or D-shaped. The cross-section may be taken on a plane parallel to a transverse plane, median plane, or both. If the dispenser is located at the rear of the feeder, the cross-section of the dispenser cover may be taken along a plane substantially parallel to the transverse plane of the feeder. The dispenser cover may have a snap-fit with the intermediate portion about a periphery of a dispenser cradle. The dispenser cover may be located opposite the open end of the hopper, the cover, or both.

The feeder may include a cover. The cover may function to protect food retained within the feeder, prevent contaminants from entering the hopper, restrict access to a chamber portion, allow temporary access to a chamber portion, or any combination thereof. The cover may be removably affixed to a hopper of the chamber portion, a sensing tower, or both. The cover may rest atop the hopper. The cover may be secured to the hopper via one or more attachments. The one or more attachments may include a friction fit, snap fit, locking tabs, the like, or a combination thereof. For example, the perimeter of the cover may have a snap fit with a perimeter of the hopper. The perimeter of the cover may fit at least partially or completely within an inside of the perimeter of the hopper. By the cover resting within the hopper, the peripheral edge of the cover is not able to be easily accessed. Accessibility may refer to an animal or child trying to lift the cover by the peripheral edge with their teeth, paws, hands, and/or the like, such as out of curiosity or desire for the food within the hopper. By reducing accessibility to the peripheral edge of the cover, one or more animals or humans may be prevented from accidentally or intentionally lifting the cover off of the hopper. The cover may have a cross-sectional shape substantially similar to a cross-sectional shape of the hopper. The cross-sectional shape may refer to one taken substantially perpendicular to a longitudinal axis of the hopper. The cross-sectional shape of the cover may be square, rectangular, elliptical, circular, triangular, the like, or a combination thereof. The cover may be located opposite and/or adjacent to one or more walls of the hopper. The cover may be located generally opposite a bottom wall. The cover may receive a portion of a sensing tower. The cover may include one or more openings. One or more openings may be formed in the cover so as to receive the sensing tower therethrough. One or more openings may be concentric with or off-center from a sensing tower, hopper opening, longitudinal axis, or a combination thereof. The one or more openings may be sized to allow for any portion of a sensing tower to be located therein. The one or more openings may receive an upper end of the sensing tower, a cap of the sensing tower, or both. The one or more openings may be formed in a handle of the cover.

The feeder may include a handle. The handle may function to facilitate removal of a cover, placement of a cover, carrying of the feeder, or a combination thereof. The handle may be part of the housing. The handle may be integral with or affixed to any portion of the housing. The handle may be included as part of a chamber portion, intermediate portion, base portion, or any combination thereof. The handle may be included as part of the cover. The handle may be affixed to or integral with the cover. The handle may be centered or off-center relative to the cover. The handle may be centered to allow for receiving, engaging with, and/or locking relative to a sensing tower. The handle may have any suitable shape allowing for placement, removal, or both of a cover from the chamber portion. The handle may be formed by one or more indentations, projections, or both in the cover, or another part of the housing. The cover may be formed by opposing indentations. The indentations may have any suitable shape for allowing gripping of a handle body. The indentations may have a cross-sectional shape which may be substantially D-shaped, rectangular shaped, the like, or a combination thereof. The cross-sectional shape may be taken at a cross-section substantially perpendicular to a longitudinal axis, median plane, transverse plane, or a combination thereof. The handle body may be a surface of the housing, such as the cover, located between the indentations, projections, or both. As an example, opposing indentations may be distanced from one another to form a handle body therebetween. An opening of the cover may be located within the handle. The opening of the cover may be located within the handle body. A portion of the sensing tower may extend through the opening of the handle body. The cover may be locked in place by one or more locks.

The feeder may include one or more locks. The one or more locks may be any lock suitable for retaining a cover in place, preventing an animal from removing the cover, allowing a user to intentionally remove and re-affix the cover, or a combination thereof. The one or more locks may be located on the cover, the sensing tower, the hopper, or any combination thereof. The one or more locks may include one or more deflectable tabs with a snap fit; one or more spring-based locks; one or more threaded locks; the like; or a combination thereof. For example, the one or more locks may include a pinch-grip lock having one or more springs. The one or more locks may be located near the opening in the cover, about a sensor tower, or both. One or more lock portions of a cover may engage with one or more lock portions of a sensor tower. For example, a lock portion affixed to the cover may engage with a cap and/or upper end of a sensing tower.

The feeder may include an intermediate portion. The intermediate portion may function to house one or more components therein, join a base portion to a chamber portion, or both. The intermediate portion may function to house or include one or more motorized components, drive sources, power sources, sensors, electronics, sensor towers, control panels, dispensers, or a combination thereof. The intermediate portion may be adjacent to the chamber portion, base portion, or both. The intermediate portion may be located between the chamber portion and base portion. The intermediate portion may be located between a bottom wall of the chamber portion and an open end of the base portion. The intermediate portion may include a hollow interior. The hollow interior may be referred to as a mechanism cavity. The mechanism cavity may house one or more portions of one or more motorized components, drive sources, power sources, sensors, electronics, the like, or a combination thereof. The intermediate portion may be comprised of a lower shell, an upper shell, or both. The hollow interior may be formed by a lower shell generally opposing an upper shell. The lower shell may be separate from or integrally formed with the upper shell. The upper shell and lower shell may have a clam-shell fit forming the mechanism cavity therebetween.

The intermediate portion may include an upper shell. The upper shell may function to provide support for a chamber portion, hopper, or both. The upper shell may function to house a dispenser. The upper shell may function to include a sensing tower, control panel, dispenser cradle, chute, or a combination thereof. The upper shell may have a shape suitable for being located adjacent to and cooperating with a hopper. The upper shell may have a shape substantially reciprocal with a base wall of a hopper. The upper shell may taper or slope from the front and side walls to the rear. The upper shell may have a sensing tower projecting therefrom. The upper shell may taper from the exterior periphery toward the sensing tower. The upper shell may taper from a control panel toward the sensing tower, cradle dispenser, or both.

The feeder may include one or more sensing towers. A sensing tower may function to sense food within a chamber portion, cooperate with a cover to prevent access into a hopper, or both. A sensing tower may be part of or affixed to any portion of the housing suitable for sensing food within a chamber portion, cooperating with a cover, or both. A sensing tower may be located in a hopper to sense the presence and/or amount of food within the hopper. A sensing tower may be integral with or affixed to a chamber portion, intermediate portion, base portion, or a combination thereof. A sensing tower may be affixed to or integral with a hopper (e.g., bottom wall), cover, upper shell, or a combination thereof. A sensing tower may extend upward toward a cover from an upper shell, from a base wall of a hopper, or both. A sensing tower may pass through a hopper opening of the hopper. A sensing tower may extend downward from a cover toward a bottom wall of a hopper, upper shell, lower shell, or a combination thereof. A sensing tower may be substantially co-axial, centered, or off-centered with a longitudinal axis of the feeder. A sensing tower may have any suitable shape for including one or more electrical components therein, retaining one or more sensors, helping funnel food toward a dispenser, or any combination thereof. The sensing tower may be hollow, partially hollow, solid, or a combination thereof. Being at least partially hollow may provide a space for one or more electrical connections to extend through the interior of the sensing tower toward an upper end of the sensing tower. The hollow portion of the sensing tower may be in direct communication with the mechanism cavity of the intermediate portion. The sensing tower may be conical, cylindrical, cubical, prismed, the like, or a combination thereof. The sensing tower may have one continuous shape throughout its length or a combination of differing shapes. The sensing tower may be conical and taper toward the cover. The tapering may aid in helping funnel food toward a dispenser. The sensing tower may be cylindrical. The sensing tower may have both a conical portion and a cylindrical portion. The conical portion may be located adjacent to the cylindrical portion. A conical portion may taper toward an adjacent cylindrical portion. A rounded cross-section, taken perpendicular to a longitudinal axis, whether from a cylindrical portion, conical portion, or the like, may be beneficial in being free of sharp edges and providing a continuous exterior surface. The continuous exterior surface of the sensing tower may allow for food to easily move around the sensing tower while moving toward the dispenser cradle. The sensing tower may have a free end. The free end may be the end of the sensing tower opposite the surface to which it is attached or integral to. The free end may be the upper end of the sensing tower opposite the upper shell. The sensing tower may include a cap. The cap may function to cooperate with a cover, house one or more sensors, house one or more status indicators (e.g., lights), protect one or more electrical components, restrict access into the sensing tower, or a combination thereof. One or more status indicators within a cap may work with one or more sensing devices. The one or more status indicators within a cap may indicate a status of food within a hopper, such as a fill level. The one or more status indicators may have light and/or color visible through the cap at a cover. The cap may be located on the sensing tower nearest the cover, opposite the upper shell, at a free end of the sensing tower, or any combination thereof. For example, the cap may be located on a cylindrical portion at the upper end of the sensing tower. The cap may be retained onto the sensing tower by one or more threads, a friction fit, a snap fit, the like, or any combination thereof. The cap may at least partially reside within an opening of a cover. The cap may engage with one or more locks of the cover. The cap may include one or more lock engagement features which mate with one or more locks of the cover.

The feeder may include one or more sensing devices. The one or more sensing devices may function to sense a presence, distance, amount, or a combination thereof of food within a chamber portion, an intermediate portion, a base portion, or any combination thereof. The one or more sensing devices may be part of a sensing tower. The one or more sensing devices part of a sensing tower may be referred to as one or more tower sensors, hopper sensors, the like, or both. One or more sensing devices may be affixed to a sensing tower at an upper end, between an upper end of the sensing tower and a cap, within at least a portion of an interior of a sensing tower, or any combination thereof. One or more sensing devices being located at an upper end of a sensing tower, toward the top of the hopper, adjacent to a cover, or a combination thereof may be particularly beneficial in providing an optimal sensing presence (i.e., line of sight) of the entire hopper. One or more sensing devices may be configured to sense the presence of food in a chute, serving area, feeding dish, or a combination thereof. One or more sensing devices configured to sense the presence of food in a chute, serving area, feeding dish, or a combination thereof may be referred to as one or more chute sensing devices, chute sensors, or both. One or more sensing devices may be located above a chute, serving area, serving wall, outer dish, feeding dish, or a combination thereof. One or more sensing devices may be affixed to a drive source, drive shaft, adapter shaft, or a combination thereof. One or more sensing devices may be part of a control board. One or more sensing devices which sense the presence of food, or lack thereof, within the chute, serving area, serving wall, outer dish, feeding dish, or a combination thereof may be referred to as one or more chute sensors. One or more sensors may be configured to transmit one or more signals to one or more control boards, processors, controllers, communication modules, computing devices, or a combination thereof based on food being sensed. One or more signals from one or more sensors may be converted into one or more status signals by the one or more control boards, controllers, processors, communication modules, computing devices, or any combination thereof. The one or more sensors may be any type of sensor suitable for detecting, monitoring, or both a level of food within a hopper, a chute, a serving area, or a combination thereof. One or more sensors may include one or more mass sensors, capacitive sensors, infrared sensors, laser sensors, ultrasonic sensors, membrane sensors, radio frequency (RF) admittance sensors, conductive sensors, optical interface sensors, microwave sensors, the like, or combination thereof. Based on a signal from one or more sensors, a control panel may provide a status to user; a drive source may initiate rotation and dispensing of food by a dispenser; rotation of a drive source or dispenser may be prevented; or any combination thereof. For example, if a chute dispenser senses a feeding dish, serving wall, or chute is empty of food, a signal from the one or more chute dispensers may initiate dispensing of food by a drive source and dispenser. As another example, if a chute sensor senses food located within a chute, a signal from a chute sensor may prevent rotation of a dispenser. The presence of food within the chute may mean that another serving of food in the feeding dish is not necessary as previous servings may not have yet been consumed. As a further example, if one or more sensors detect food in the hopper below a certain volume, the absence of food in the hopper, or both, a signal from the one or more sensors may result in one or more status indicators informing a user to refill the hopper.

The feeder may include a dispenser cradle. The dispenser cradle may function to house a dispenser, cooperate with a dispenser and/or chute to guide food toward a serving area, or a combination of both. A dispenser cradle may be formed in any portion of the housing suitable for housing a dispenser and allowing the dispenser to move food from a hopper portion to a serving area. A dispenser cradle may be formed in a chamber portion, intermediate portion, base portion, or any combination thereof. A dispenser cradle may be formed as part of an upper shell, lower shell, or both. A dispenser cradle may be located in a front, rear, side, or a combination thereof of the feeder. For example, a dispenser cradle may be formed as part of an upper shell in a rear of the feeder. The dispenser cradle may extend from the upper shell toward a bottom of the feeder. The dispenser may include a dispenser therein. The dispenser cradle may have any suitable shape for retaining a dispenser. The dispenser cradle may have a cross-sectional shape which may be circular, elliptical, square, triangular, trapezoidal, the like, or any combination thereof. The dispenser cradle may have a shape resembling a half circle. The dispenser cradle may have a shape reciprocal with at least a portion of a dispenser, such as the rocker body. A cross-section of the dispenser cradle may be taken perpendicular to a longitudinal axis of the dispenser, parallel to a longitudinal axis of the feeder, parallel to a transverse plane of the feeder, or a combination thereof. The dispenser cradle may be formed by the surface of the upper wall. The dispenser cradle may be formed by a portion of the upper wall which slopes at a different angle than the rest of the upper wall. The dispenser cradle may be formed by one or more portions of the upper wall referred to as the serving wall. One or more serving walls may angle downward to form the cross-sectional shape of the dispenser cradle. One or more serving walls may be opposite each other. One or more serving walls may have a general C or U shape. The serving wall may transition into a chute. Opposing serving walls may be distanced from one another at a lower end of the dispenser cradle. A space between serving walls may be referred to as a dispenser outlet. The dispenser outlet may be where a dispenser cradle is in fluid communication with and transitions to a chute. The chute may be formed on a surface of the upper shell opposite the sensing tower.

The feeder may include a chute. A chute may function to guide food from a chamber portion, hopper, dispenser, or a combination thereof to a base portion, feeding cavity, serving area, feeding dish, or a combination thereof. A chute may be in communication with a chamber portion. A dispenser may be located between a chute and a chamber portion. The chute may receive food from a dispenser. The chute may be attached to or part of a chamber portion, intermediate portion, base portion, or any combination thereof. The chute may be affixed to or integrally formed with one or more shells of an intermediate portion. The chute may be integral with an upper shell. The chute may extend from a dispenser cradle, one or more serving walls, or both. The chute may be configured to guide food toward a serving area. The chute may guide food toward the serving area with the aid of gravity. The chute may include a chute wall, a plurality of side walls, and a chute opening. The chute wall may be located between two opposing side walls. The chute wall may face toward the serving area. The opposing side walls may extend from the chute wall. The opposing side walls may be generally orthogonal to the chute wall. The chute wall and opposing side walls may form a chute channel. The chute channel may have any suitable shape for having food pass therethrough, such as a C-channel. At the end of the chute channel is a chute opening. After being dispensed from a dispenser, the food may travel through the chute channel and the chute opening into the serving area. The chute may be at least partially located above the serving area. The chute may be in contact with a portion of the serving area. The chute may be in contact with the serving wall. The chute may abut with and/or overlap to the serving wall. For example, a chute wall may overlap the serving wall so that food may travel via the chute wall and continue via the serving wall. The chute may project into the feeding cavity. The chute may be angled at any angle suitable for the food to overcome friction between the food and one or more surfaces of the chute. The chute may be angled toward the serving area, downward to a bottom of the feeder, toward the front of the feeder, away from the rear, or any combination thereof. The chute may be angled at a same or different angle as a serving wall, outer dish, feeding dish, or a combination thereof. For example, a chute wall may be located at substantially the same angle as a serving wall. A chute may be angled at about 90 degrees or greater, 95 degrees or greater, or even about 100 degrees or greater relative to the longitudinal axis, transverse plane, or both of the feeder. The angle may be about 150 degrees or less, about 140 degrees or less, about 130 degrees or less, or even about 120 degrees or less relative to the longitudinal axis, transverse plane, or both of the feeder. The angle may be the angle formed between an upward facing surface (e.g., serving wall, dish base wall) of a portion of the serving area and the longitudinal axis, transverse plane, or both. The angle may be the angle facing toward a front of the feeder. The chute may extend from the rear of the upper shell toward a lower shell, under a lower shell, under a dispenser cradle, under a dispenser, or a combination thereof.

The intermediate portion may include a lower shell. The lower shell may function to cooperate with an upper shell to form a mechanism cavity suitable for housing one or more components therein. The lower shell may work with a base portion to form a feeding cavity. The lower shell may have any suitable shape for forming a mechanism cavity with an upper shell. The lower shell may be affixed to or integral with the upper shell. The lower shell may be located between a base portion and an upper shell. The lower shell may have one or more portions with a slope steeper than a slope of the upper shell. The slope may allow for a mechanism cavity to be formed large enough for one or more components to fit therein. The lower shell may resemble a partial bowl shape. The lower shell may have a cross-sectional shape resembling an L-shape, C-shape, the like, or a combination thereof. The cross-sectional shape may be taken parallel to a median plane. The lower shell may slope downward from a hopper at the front of a feeder, a control panel, or both toward a food chute, serving area, or both. The lower shell may form or include a control wall. The control wall may help control the flow of food from the chute toward a feeding dish. The control wall may reduce a height of the overall flow of food from the chute so that the flow of food may be delivered in a controlled manner into the feeding dish. The control wall may project downward, toward the base portion, toward a bottom of the feeder, toward the serving area, toward the serving wall, or a combination thereof. The control wall may be located in front of (e.g., closer to a front of the feeder) a chute. The control wall may be parallel, perpendicular, or any angle therebetween relative to a longitudinal axis, transverse plane, median plane, or a combination thereof. For example, the control wall may project downward toward the serving area substantially parallel to the longitudinal axis and transverse plane.

The feeder may include a control panel. The control panel may function to allow a user to select one or more functions and/or operations of the feeder, provide a user with a status of the feeder, or any combination thereof. The control panel may be affixed to or part of any portion of the housing. The control panel may be located on the base portion, intermediate portion, chamber portion, or any combination thereof. The control panel may be located on a front of both an upper shell and lower shell. The upper shell and lower shell may have a control panel housing formed therein. The control panel housing may be a portion of the upper and lower shells reciprocal with at least a periphery of a portion of a control panel, such as a bezel. The control panel may be located on a front, rear, side, top, or any combination thereof of the feeder. The control panel may include one or more selection interfaces, status indicators, a bezel, or any combination thereof. A bezel may retain a control panel in place relative to the housing. A bezel may provide an appealing aesthetic of the control panel. The bezel may be retained onto the housing by one or more fasteners, a snap fit, a friction fit, an adhesive, the like, or any combination thereof. The bezel may include a bezel opening therethrough. The bezel opening may provide access to one or more selection interfaces, status indicators, or both.

The feeder may include a selection interface. The selection interface may be configured to allow a user to initiate, pause, and/or stop one or more operations of the feeder. One or more operations may include activation of rotation of a dispenser, stopping rotation of a dispenser, powering the feeder on, powering the feeder off, the like, or a combination thereof. A selection interface may be in electrical communication with a dispenser, power source, drive source, or a combination thereof. The selection interface may include one or more buttons, switches, levers, knobs, the like, or a combination thereof. The selection interface may be in electrical communication with one or more status indicators, processors, controllers, communication modules, a drive source, the like, or any combination thereof. The selection interface may include one or more of a power switch, dispense button, pause or stop button, the like, or a combination thereof. A power switch may turn the feeder on, off, or both. A dispense button may cause a drive source to drive a dispenser into one or more dispensing positions from one or more resting positions. A pause or stop button may cause a drive source to return a drive dispenser to a resting position from a dispensing position, stop a dispenser from moving to a dispensing position and/or resting position, or a combination thereof. Selection from the status interface may result in a status indicator lighting up, turning off, displaying information on a screen, or a combination thereof. The feeder may include one or more status indicators. The one or more status indicators may function to inform a user of a status, function, operation, or a combination thereof of the feeder. The one or more status indicators may include one or more lights, screens, the like, or both. The one or more status indicators may be in electrical communication with a selection interface, one or more sensors, a controller, a processor, a communication module, the like, or a combination thereof.

The feeder may include one or more controllers. The one or more controllers may function to receive one or more signals, transmit one or more signals, control operations of one or more components of the feeder, or a combination thereof. The one or more controllers may be in communication with one or more sensors, selection interfaces, status indicators, drive sources, power sources, or a combination thereof. The one or more controllers may be adapted to receive one or more signals from the one or more sensors. The one or more controllers may be in communication with one or more sensors. The one or more controllers may be in electrical communication with one or more sensors. The one or more controllers may interpret one or more signals from one or more sensors as one or more status signals. The one or more controllers may reside within or be in communication with the feeder. The one or more controllers may be located within a base portion, intermediate portion, chamber portion, or any combination thereof. The one or more controllers may include one or more controllers, microcontrollers, microprocessors, or a combination thereof. The one or more controllers may be in communication with and/or include one or more communication modules. The one or more controllers may include one or more processors.

The feeder may include one or more communication modules. The one or more communication modules may allow for the litter device to receive and/or transmit one or more signals from one or more computing devices, be integrated into a network, or both. The one or more communication modules may have any configuration which may allow for one or more data signals from one or more controllers to be relayed to one or more other controllers, communication modules, networks, computing devices, processors, the like, or any combination thereof located external of the feeder. The one or more communication modules may include one or more wired communication modules, wireless communication modules, or both. A wired communication module may be any module capable of transmitting and/or receiving one or more data signals via a wired connection. One or more wired communication modules may communicate via one or more networks via a direct, wired connection. A wired connection may include a local area network wired connection by an ethernet port. A wired communication module may include a PC Card, PCMCIA card, PCI card, the like, or any combination thereof. A wireless communication module may include any module capable of transmitting and/or receiving one or more data signals via a wireless connection. One or more wireless communication modules may communicate via one or more networks via a wireless connection. One or more wireless communication modules may include a Wi-Fi transmitter, a Bluetooth transmitter, an infrared transmitter, a radio frequency transmitter, an IEEE 802.15.4 compliant transmitter, the like, or any combination thereof. A Wi-Fi transmitter may be any transmitter complaint with IEEE 802.11. A communication module may be single band, multi-band (e.g., dual band), or both. A communication module may operate at 2.4 Ghz, 5 Ghz, the like, or a combination thereof. A communication module may communicate with one or more other communication modules, computing devices, processors, or any combination thereof directly; via one or more networks, or both; or any combination thereof.

The feeder may include a drive source. A drive source may function to apply one or more dispensing forces, apply one or more return forces, move a dispenser between one or more resting positions to one or more dispensing positions, or a combination thereof. A drive source may be in rotational communication with a drive shaft, adapter shaft, dispenser, or any combination thereof. A drive source may drive a drive shaft, adapter shaft, dispenser, or a combination thereof in one or more dispensing directions, one or more return directions, or a combination thereof. The drive source may apply a first direction of torque, a second direction of torque, or both to a drive shaft, adapter shaft, dispenser, or a combination thereof. A first direction of torque may be in a first dispensing direction, second return direction, or both. A first direction of torque may result in a dispenser moving from a resting position to a first dispensing position, from a second dispensing position to a resting position, or both. A second direction of torque may be in a second dispensing direction, first return direction, or both. A second direction of torque may result in a dispenser moving from a resting position to a second dispensing position, from a first dispensing position to a resting position or both. A drive source may be a motor or other power supply. The drive source may be an electronic motor, pneumatic power supply, hydraulic power supply, another power supply, or a combination thereof. The drive source may be in electronic communication with one or more power sources.

The feeder may include a drive shaft. A drive shaft may function to transfer torque from a drive source to an adapter shaft, dispenser, or both. The drive shaft may be in rotatable communication with a drive source, adapter shaft, dispenser, or any combination thereof. The drive source may rotate the drive shaft. By applying a first direction of torque, the drive shaft may rotation in a first direction. By applying a second direction of torque, the drive shaft may rotate in a second direction. The drive shaft may pass through dispenser, adapter shaft, or both. The drive shaft may be directly or indirectly engaged with the dispenser. The drive shaft may be engaged with an adapter shaft. For example, the drive shaft may be rotationally engaged with and received within a hollow interior of an adapter shaft and the adapter shaft may be rotationally engaged with and received within a shaft cavity of a dispenser. The drive shaft may have a friction fit with the adapter shaft. The drive shaft may have one or more engagement features which engage one or more mating engagement features of an adapter shaft, dispenser, or both. For example, the drive shaft may have one or more splines which mesh within one or more grooves of the adapter shaft, dispenser, or both. The drive shaft may extend through a control board of the feeder. While the drive shaft passes through the control board, the control board may be free from being rotationally engaged with the drive shaft, drive source, adapter shaft, dispenser, or a combination thereof. For example, the drive shaft may have an outer diameter less than an inner diameter of an opening of the control board. The drive shaft may be located in the chamber portion, intermediate portion, base portion, or a combination thereof. The drive shaft may be located in a same or different portion of a housing as a drive source. The drive shaft may be located in a mechanism cavity of the housing, dispenser cradle, or both.

The feeder may include an adapter shaft. An adapter shaft may function to transfer torque from a drive source, a drive shaft, or both to a dispenser. The adapter shaft may be in rotatable communication with a drive source, drive shaft, dispenser, or a combination thereof. The adapter shaft may receive a first direction of torque, second direction of torque, or both from a drive source, drive shaft, or both. The adapter shaft may transfer a first direction of torque, second direction of torque, or both to a dispenser from drive source, drive shaft, dispenser, or a combination thereof. The adapter shaft may receive at least a portion of the drive shaft. The drive shaft may be co-axial or off-center relative to the adapter shaft. The drive shaft may be located about an exterior of the adapter shaft or the drive shaft may be received within at least a partially hollow interior of the adapter shaft. The adapter shaft may be located within or about a portion of the dispenser. The adapter shaft may be at least partially located within a shaft cavity of the dispenser. The adapter shaft may be centered or off-centered relative to the shaft cavity. The adapter shaft may have one or more engagement features for rotationally engaging, mating, and/or meshing with a drive shaft, dispenser, or both. One or more engagement features may include an outer and/or inner diameter which results in a friction fit; one or more splines, grooves, or both about an exterior surface, interior surface, or both; or any combination thereof. One or more engagement features may also include a cross-sectional shape of the adapter shaft which results in rotational engagement. A cross-sectional shape may take the form of a triangle, square, oval, rectangle, D-shape, B-shape, V-Shape, the like, or any combination thereof. A cross-sectional shape may refer to a cross-section of an adapter shaft taken parallel to a median plane of the feeder, perpendicular to a longitudinal axis of the transfer shaft, or both. The adapter shaft may be located adjacent to a control board. The adapter shaft may include a disc surface. The disc surface may project like a flange from the adapter shaft. The disc surface may project in a direction generally perpendicular to a longitudinal axis of the transfer shaft. The disc surface may have a cross-sectional shape which is square, rectangular, elliptical, circular, the like, or any combination thereof. A cross-sectional shape of the disc surface may be taken along a cross-section generally perpendicular to a longitudinal axis of the transfer shaft. The disc surface may be adjacent to a control board, dispenser, or both. The disc surface may be located between a control board, drive source, or both and a dispenser. The adapter shaft may be free of being rotationally engaged with or even affixed to the control board. The adapter shaft may be located in the chamber portion, intermediate portion, base portion, or a combination thereof. The adapter shaft may be located in a same or different portion of a housing as a drive source, adapter shaft, dispenser, or a combination thereof. The adapter shaft may be located in a mechanism cavity of the housing, a dispenser cradle, or both.

The feeder may include a dispenser. The dispenser may function to segregate a portion of the food from the chamber portion, transfer a portion of the food from a chamber portion to a base portion, or both. The dispenser may be particularly advantageous with food which is a granular material. The dispenser may be located in any portion of the housing suitable for segregating food from a chamber portion and transferring food to a serving area. The dispenser may be located between a chamber portion and a base portion, within an intermediate portion, or both. The dispenser may be located within a dispenser cradle. The dispenser may be configured to dispense a predetermined amount of food from the chamber portion to the serving area. The dispenser may include a rocker body, one or more fins, a fin channel, a shaft cavity, or a combination thereof. The dispenser may be rotationally engaged with a drive source, drive shaft, adapter shaft, or any combination thereof. The dispenser may be configured to rotate in a plurality of directions, such as a first direction and a second direction. Rotation in a first direction may move the dispenser from a resting position to a first dispensing position, from a second dispensing position to a resting position, or both. Rotation in a second direction may move the dispenser from a resting position to a second dispensing position, from a first dispensing position to a resting position or both. A rocker body of the dispenser may receive a drive shaft, adapter shaft, or both therethrough.

The dispenser may include a rocker body. The rocker body may function to rotationally engage the dispenser with a drive source, rotate one or more fins, cooperate with one or more fins to create a serving cavity, cooperate with one or more fins and/or hopper surfaces to allow and/or restrict access of food into a chute, or any combination thereof. The rocker body may be located between a chute and a hopper. The rocker body may be located within a dispenser cradle. The rocker body may have any suitable shape for cooperating a drive source, one or more fins, a hopper, a chute, or a combination thereof. A rocker body may have at least a partially cylindrical shape. A rocker body may have shape resembling about half of a cylinder. A rocker body may have a cross-section which may be D-Shaped, half-moon shaped, W-shaped, the like, or a combination thereof. A cross-section may be taken perpendicular to a longitudinal axis of the dispenser, parallel to a longitudinal axis of the feeder, parallel to a transverse plane of the feeder, or a combination thereof. A cross-section may substantially resemble a D-Shape or half-moon. A rocker body may have a size suitable for restricting entry into a dispenser cradle, only allowing food located within a serving area to pass through the dispenser cradle, or both. The rocker body may have a width about equal to or smaller than a width of a dispenser cradle. The width of the rocker body may still allow the rocker body to rotate within the dispenser cradle. A difference between the width of the rocker body and the dispenser cradle is smaller than a typical size of a piece of granular food material. The width of the rocker body and the dispenser may be measured as an overall width (e.g., diameter). The width of a rocker body may be between about 80% or greater, 90% or greater, to about 95% or greater of the width of a dispenser cradle. The width of the rocker body may be about 100% or less, about 98% or less, or even about 96% or less than a width of a dispenser cradle. A rocker body may be hollow, partially hollow, solid, or a combination thereof. The rocker body may be substantially solid along its length. The rocker body may have a hollow portion. The rocker body may have a shaft cavity formed therein. The shaft cavity may extend from one end partially or completely to the opposing end of the rocker body. The shaft cavity may be generally centered with the overall dispenser. The shaft cavity may be offset relative to the rocker body. The shaft cavity may be offset and distanced away from the exterior surface of the rocker body. The shaft cavity may be offset and distanced closer to a fin, fin channel, or both than to an exterior surface of the rocker body. The shaft cavity may include a drive shaft, adapter shaft, or both located therein. The shaft cavity may have a shape reciprocal with that of an adapter shaft, drive shaft, or both. The shaft cavity may include one or more engagement features which engage with, mesh, or match with one or more engagement features of a drive shaft, adapter shaft, or both. The rocker body may be configured to at least partially rotate in one or more directions, such as when driven by a drive source, drive shaft, adapter shaft, or a combination thereof. One or more directions may be opposing directions, a first direction, a second direction, or a combination thereof. A rotational axis of the rocker body may be co-axial, concentric, or off-centered with a rotational axis of a drive source, drive shaft, adapter shaft, or any combination thereof. A rotational axis may extend through the shaft cavity. The rocker body may have one or more fins projecting therefrom. The one or more fins may be integral with or separate from the rocker body. The rocker body may have one or more fin engagement features. The one or more fin engagement features may function to mate with one or more fins. The one or more fin engagement features may include one or more channels, slots, brackets, hinges, the like, or any combination thereof for allowing attachment of one or more fins to the rocker body. A channel may be formed along at least a portion of or all of a length of the rocker body. The channel may be formed along an exterior surface of the rocker body closest to a shaft cavity. The channel may follow the shaft cavity across a length of the rocker body (e.g., parallel to). The channel may have any suitable shape for receiving and/or engaging with an end of a fin. The channel may have a shape substantially reciprocal with a portion of a fin, such as an attached end of the fin. The channel may be V-Shaped, T-Shaped, the like, or a combination thereof. For example, the rocker body may include a fin channel which is a T-shaped slot along a length of the rocker body. The fin channel may receive an attached end of the fin therein.

The dispenser may include one or more fins. The one or more fins may function to segregate a portion of food from a chamber portion, prevent entry of food into a dispenser, cooperate with a rocker body to create a serving cavity, or a combination thereof. The one or more fins may function with a portion of a rocker body to form a predetermined serving size within a serving cavity. The one or more fins may include a single fin or a plurality of fins. A single fin may be advantageous in allowing a dispenser to dispense food without having to rotate a full 365 degrees. A single fin may be advantageous by only having one flexible component relative to the rocker body with less fins which may be damaged or jammed over time and use of the feeder. A single fin may be beneficial in allowing a dispenser to rotate (e.g., rock) back and forth between first and second dispensing positions. The one or more fins may be rigid, semi-rigid, semi-flexible, flexible, or a combination thereof. The one or more fins may be flexible along a length of the one or more fins. Flexibility of the fin may be advantageous in allowing a fin to scrape along a serving wall of a dispenser cradle while transitioning to a dispensing position, pushing food toward a chute while moving toward a dispensing position, or both. A flexible fin may also prevent jamming of the dispenser while rotating to and from one or more dispensing positions. One or more fins may be affixed to or integral with a rocker body. Rotational movement of the rocker body results in rotation of one or more fins about the same rotational axis. One or more fins may be affixed to the rocker body at an attached end. The attached end may have a shape reciprocal with an engagement feature of the rocker body. The attached end may have a shape reciprocal with a channel of the rocker body. For example, the attached end may be in the shape of a "T". The attached end may reside with and be engaged in a fin channel of the rocker body. Opposite the attached end of a fin is a free end. A fin may also be hingedly attached to a rocker body. A fin may be hinged, static, or both relative to the rocker body. Static may refer to the fin moving with the rocker body while still maintaining flexibility. A height of a fin may be the distance from the attached end to the free end. The height of the fin may allow the free end to be in contact with or free of contact with a serving wall, a portion of a hopper, a portion of a shell, a portion of a chute, or a combination thereof. The height of the fin may be about equal to or less than half a width, a radius, or both of a rocker body, dispenser, serving wall cross-section, or a combination thereof. A fin may have a length. The length of a fin may be measured as a distance from an end of the fin closest to a rear of the feeder to an end of the fin closest to the front of the feeder, substantially parallel to a rotational axis of the dispenser, or both. The length of the fin may be greater than, about equal to, or less than a length of the rocker body. A fin together with a rocker body may define one or more serving cavities.

The one or more fins may be continuous or discontinuous. Continuous may mean a fin is a one-piece material from end to end without any interruptions (e.g., cut-outs or notches). Discontinuous may mean a fin has one or more cut-outs, notches, slits, the like, or a combination thereof. A fin may have one or more slits. The one or more slits may provide flexibility to a fin while allowing the material to still be sufficiently strong to push food from a cavity (e.g., hopper) toward a chute. The one or more slits may aid in preventing damage to the fin, jamming of the fin during rotation between dispensing positions, or both. The one or more slits may extend partially, completely, or both from a free end to an attached end, rotational axis, dispenser body, a height of a fin, or a combination thereof. A height of a fin may be measured as the distance from a free end to an attached end of a fin. The one or more slits may extend about 10% or more, about 25% or more, about 50% or more, or even about 60% or more of a height of a fin. The one or more slits may extend about 100% or less, about 90% or less, about 85% or less, or even about 80% or less of a height of a fin. For example, a fin may extend from a free end toward an attached end for about 60% to about 90% of a height of a fin. For an example, a fin may extend from a free end toward an attached end for about 70% to about 80% of a height of a fin. The one or slits may be located along any length of a fin. A length may be the distance of the fin parallel to a rotational axis, from a front of a feeder to a rear, along a length of the attached end, along a length of a free end, or any combination thereof. One or more slits may be located at about one quarter the length, one third the length, one half the length, two thirds the length ½ the length, two thirds the length, any distance therebetween, or a combination thereof. For example, one slit may be located about halfway down the length of the fin extending from the free end toward the attached end. The one or more slits may have a width. The width of a slit may be measured along a length of a fin (e.g., parallel to a length). The width of a slit may be about 1% or greater, 2% or greater, 3% or greater, 4% or greater, or even about 5% or greater than a total length of a fin. The width of a slit may be about 15% or less, about 12% or less, about 10% or less, or even about 8% or less than a total length of a fin. The width of a slit may be smaller than or equal in size to a typical pet food size. By having the width of the slit smaller than a granule of pet food, the slit does not allow for food to pass through and thus remain in the hopper cavity as opposed to being pushed toward a chute and serving cavity.

A dispenser may include one or more serving cavities. One or more serving cavities may function to define a serving size of food to be delivered from a hopper to a serving area. A serving cavity may be a gap formed between a rocker body and a fin. A fin may be angled from an adjacent surface of a rocker body to form the serving cavity. The angle between the fin and the adjacent surface of the rocker body may be acute, perpendicular, or obtuse. The angle between the fin and the adjacent surface of the rocker body may be about 30 degrees or greater, about 50 degrees or greater, about 60 degrees or greater, or even about 65 degrees or greater. The angle between the fin and the adjacent surface of the rocker body may be about 110 degrees or less, about 90 degrees or less, about 80 degrees or less, or even about 75 degrees or less. The angle between the fin and the rocker body may be selected to result in a specific serving volume of food dispensed by the dispenser per each dispensing rotation. The serving cavity may have a cross-sectional shape which is substantially V-shaped, C-shaped, U-shaped, triangular, trapezoidal, the like, or a combination thereof. A cross-section may be taken substantially perpendicular to a rotational axis. The cross-sectional shape may be along a portion of or along an entire length of a dispenser, rocker body, fin, or a combination thereof. The serving cavity, when rotated into a dispensing position, such that the serving cavity is closed off by a serving wall, may have a serving volume. The serving volume may be any volume adequate for feeding an animal. The serving volume may be about 0.0625 cups or greater, about 0.125 cups or greater, about 0.25 cups or greater, or even about 0.5 cups or greater. The serving volume may be about 2 cups or less, about 1.5 cups or less, or even 1 cup or less.

The dispenser may be configured to move between one or more dispensing positions and one or more resting positions. The one or more dispensing positions may function to deliver food from a chamber interior to a serving area, block additional food from entering a dispenser, or both. The one or more resting positions may function to prevent food from being delivered from a chamber interior to a serving area. The one or more dispensing positions may include a single dispensing position or a plurality of dispensing positions. A plurality of dispensing positions may include two or more dispensing positions. Two or more dispensing positions may include a first dispensing position and a second dispensing position. A dispenser may rotate from a resting position to one or more dispensing positions. A dispenser may rotate about a rotational axis. Rotation of a dispenser may be initiated by a drive source. A dispenser may rotate in a first direction, second direction, or both. A first direction may be clockwise (i.e., when observing from a rear of the feeder). A second direction may be opposite a first direction. A second direction may be counterclockwise (i.e., when observing from a rear of a feeder). A dispenser may rotate about 60 degrees or greater, about 70 degrees or greater, about 80 degrees or greater, about 90 degrees or greater, or even about 100 degrees or greater from a resting position to a dispensing position. A dispenser may rotate about 170 degrees or less, about 160 degrees or less, about 150 degrees or less, about 140 degrees or less, or even about 130 degrees or less from a resting position to a dispensing position. The dispenser may return to a resting position from a dispensing position. The dispenser may not move from one dispensing position to another, without first returning to a resting position. In the resting position, the rocker body may block a pathway from the hopper to the chute. In the resting position, the fin may project into the hopper, into the chamber interior, outside of a dispenser cradle, away from the chute, or a combination thereof. In the resting position, the fin may project into the hopper at an angle generally parallel with a longitudinal axis of the feeder. In a resting position, food located within the hopper and closest to the dispenser may rest on the dispenser, on the rocker body, between the rocker body and the fin, in one or more serving cavities, or a combination thereof. In a dispensing position, the dispenser body may be rotated such that the fin rotates away from the hopper and toward the chute. In a dispensing position, the serving cavity may be rotated to be in direct communication with the chute. In a dispensing position, the rocker body may be located at least partially over the dispenser cradle, block at least some food from entering the dispenser cradle, or both. In a dispensing position, a fin may be located within the dispenser cradle, in contact with a serving wall, or both. Rotation from a resting position to a dispensing position results in segregation of food within a serving cavity from food within the hopper. As the fin rotates toward the serving wall, toward the chute, passes by a bottom wall of the hopper, and/or contacts the serving wall, the fin segregates the food of the serving cavity from the food in the hopper. As the dispenser rotates into a dispensing position, the fin further blocks additional food from entering into the serving cavity. In a dispensing position, food located within the serving cavity falls into the chute via gravity, force applied by the fin, or both. After dispensing food into the chute, the dispenser is rotated back to a resting position. To return back to the resting position, the dispenser is rotated by the drive source in an opposing direction. For example, if the dispenser was rotated in the first direction toward the chute and into a first dispensing position, the dispenser is rotated in the second and opposing direction away from the chute and back into the resting position. While transitioning from a dispensing position to a resting position, a fin may or may never surpass over the chute.

The feeder may be comprised of one or more materials. The one or more materials may be any material suitable for being shaped (e.g., molded) into the separate components of the feeder, having food located thereon and then consumed, or both. One or more materials of the housing may be comprised of a polymeric system. The polymeric system may be a thermoplastic or a thermoset material. The polymeric system may be one suitable for molding into the shape or shapes of each portion of the housing. Polymeric systems may include polyolefins, styrenics, acrylates, acrylonitriles, polycarbonates, polyurethanes, acrylonitrile butadiene styrene (ABS), and blends thereof. Such materials may be modified with a number of additives such as fillers, elastomers, fire retardants, stabilizers, and the like. The portions of the housing may be prepared by any process capable of forming the materials into the desired shapes of the housing and able to perform the necessary functions. Portions of the housing may be formed by injection molding, reaction injection molding, thermoforming, the like, or any combination thereof. Some portion of the housing may be opaque, transparent, or a combination of both. For example, a hopper may be transparent to visibly see the food within the hopper, the movement of the dispenser in the dispenser cradle, or both. One or more other materials of the feeder may be comprised of one or more flexible materials. One or more fins may be comprised of one or more flexible materials or may be comprised of materials suitable for the housing. One or more fins may be comprised of any suitable material capable of deflection, having elastomeric properties, or both. One or more fins may be comprised of one or more elastomers having viscoelasticity, one or more rubbers, or both. Exemplary flexible materials may include polyisoprene, polybutadiene, polyisobutylene, polyurethane, natural rubber, synthetic rubber, or a combination thereof.

The present disclosure relates to a method of dispensing food from a feeder. The feeder may be a feeder according to the teachings herein. The method may include moving a dispenser from one or more resting positions to one or more, or two or more, dispensing positions. The method may include moving a dispenser from a resting position to a first dispensing position, a resting position to a second dispensing position, or both. Movement from one or more resting positions to one or more dispensing positions may be triggered by a user initiating dispensing; one or more sensing devices sensing the presence, lack of presence, and/or a certain level of food within a chute, serving area, serving wall, outer dish, feeding dish, or a combination; or any combination thereof. Movement may be prevented by a user preventing movement of a dispenser; a certain level of food being detected by one or more sensing devices (e.g., chute sensors) in a chute, feeding dish, serving area, serving wall, outer dish; or a combination thereof. As described herein, the components of the feeder according to the teachings herein may cooperate together to provide for the dispensing of food.

Illustrative Embodiments

FIG. 1 illustrates a front perspective view of a feeder 10. The feeder 10 includes a housing 12. The housing 12 includes a base portion 14, intermediate portion 20, and a chamber portion 16. The chamber portion 16 includes a hopper 18. A cover 32 rests atop the hopper 18. The cover 32 includes a handle 34. The handle 34 is formed by indentations 36 within the cover 32. The cover 32 includes an opening 104. A sensing tower 84 extends through the opening 104. Located adjacent to the chamber portion 16 is the intermediate portion 20. The intermediate portion 20 includes a control panel 40. The control panel 40 includes a selection interface 42 and status indicators 44. Located between the intermediate portion 20 and the base portion 14 is a feeding cavity 22. The base portion 16 includes a serving area 24. The serving area 24 includes a feeding dish 26. Located above the serving area 24 is a chute 28. The chute 28 projects into the feeding cavity 22. The chute 28 allows for food 94 (not shown) to transfer from within the hopper 18 to the serving area 24 via a chute opening 30.

Figure 2:
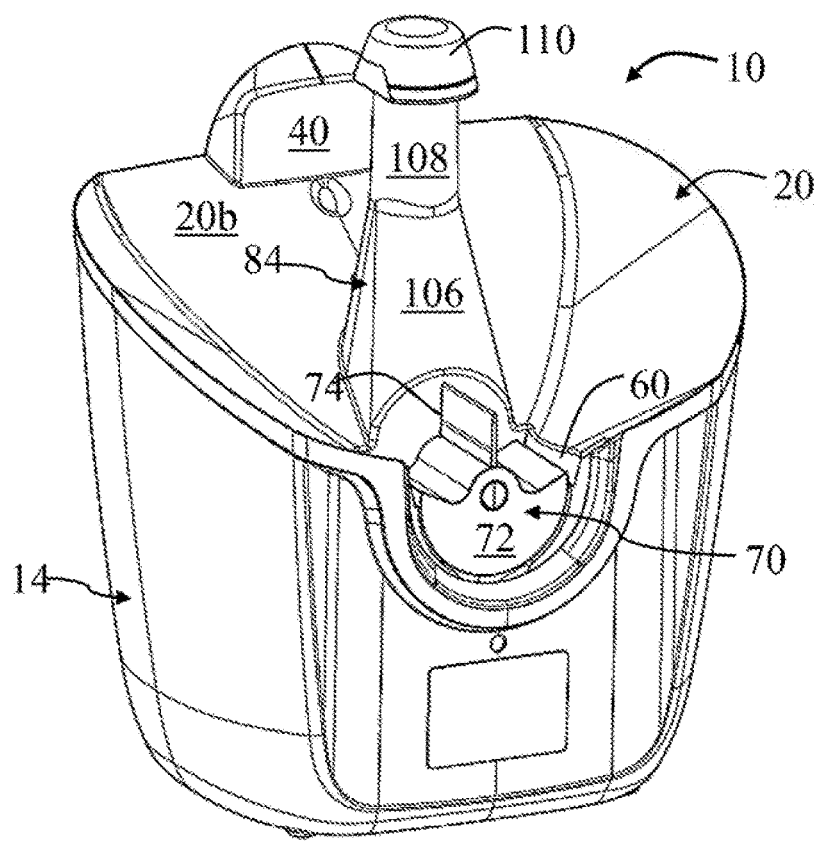
FIG. 2 is a rear perspective view of a feeder according to the teachings herein.

FIG. 2 illustrates a rear perspective view of a feeder 10 without a chamber portion 16. The feeder 10 includes an intermediate portion 20. The intermediate portion 20 includes an upper shell 20b. The intermediate portion 20 tapers downward from a control panel 40 toward a sensing tower 84. The sensing tower 84 extends upward and away from a base portion 14. The sensing tower 84 has conical portion 106 which tapers upward toward a cylindrical portion 108. The sensing tower 84 includes a cap 110. The cap 110 is located on the cylindrical portion 108. The intermediate portion 20 includes a dispenser cradle 60 formed therein. A dispenser 70 is located within the dispenser cradle 60. The dispenser 70 includes a rocker body 72 and fin 74.

Figure 3:
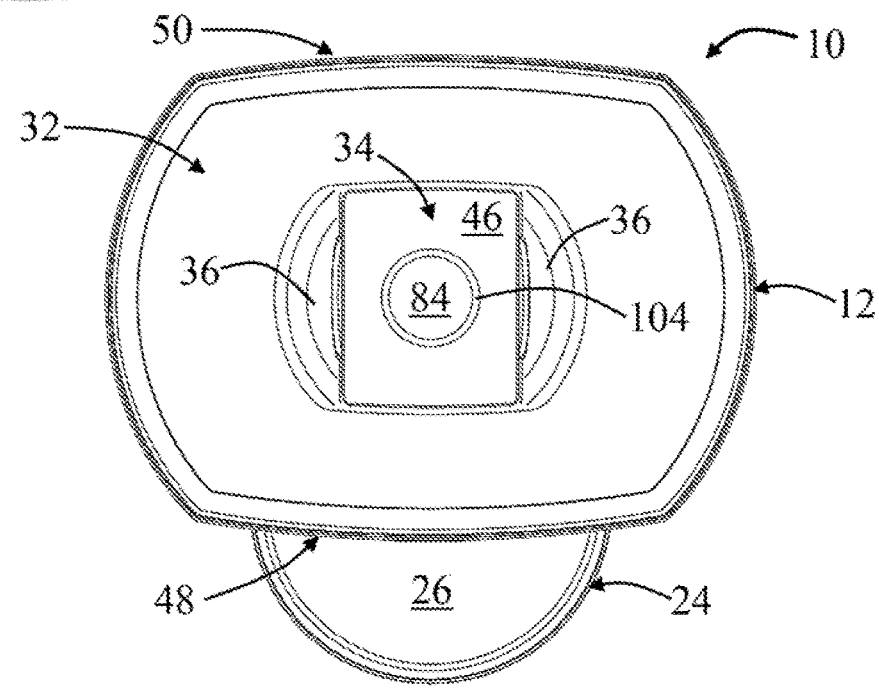
FIG. 3 is a top plan view of a feeder according to the teachings herein.

FIG. 3 illustrates a top plan view of a feeder 10. The feeder 10 includes a cover 32. The cover 32 has a handle 34. The handle 34 is formed by opposing indentations 36. The indentations 36 have cross-sectional shapes which are substantially "D-Shaped". Between the indentations 36 is a handle body 46. An opening 104 is formed within the handle body 46. The sensing tower 84 extends through the opening 104. The feeder 10 includes a front 48 opposing a rear 50. At the front 48, the serving area 24, including the feeding dish 26, projects beyond the housing 12.

Figure 4:
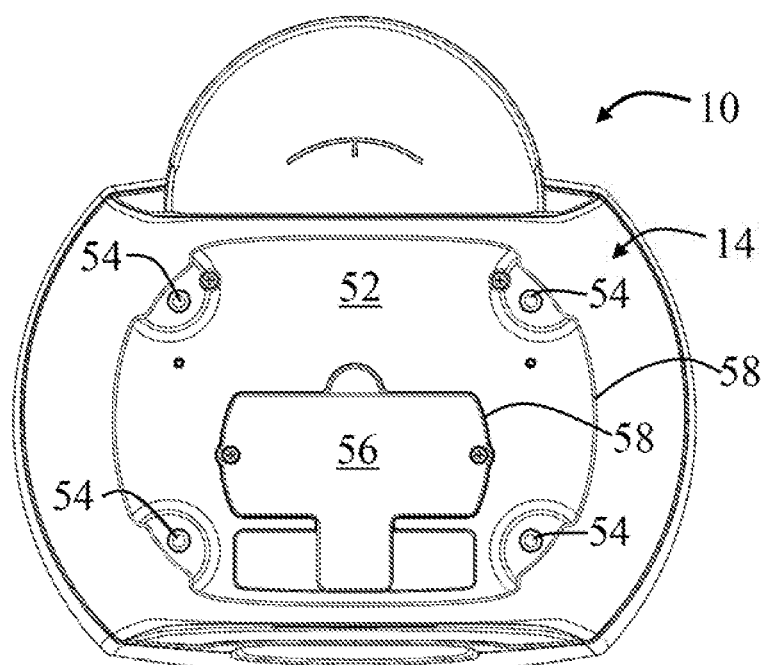
FIG. 4 is a bottom plan view of a feeder according to the teachings herein.

FIG. 4 illustrates a bottom plan view of a feeder 10. The base portion 14 includes a bottom 52. The bottom 52 includes a plurality of feet 54. The feet 54 are spaced near the periphery of the bottom 52. The feet 54 are spaced about a bottom cap 56. The bottom cap 56 covers a bottom opening 58 in the base portion 14.

Figure 5:
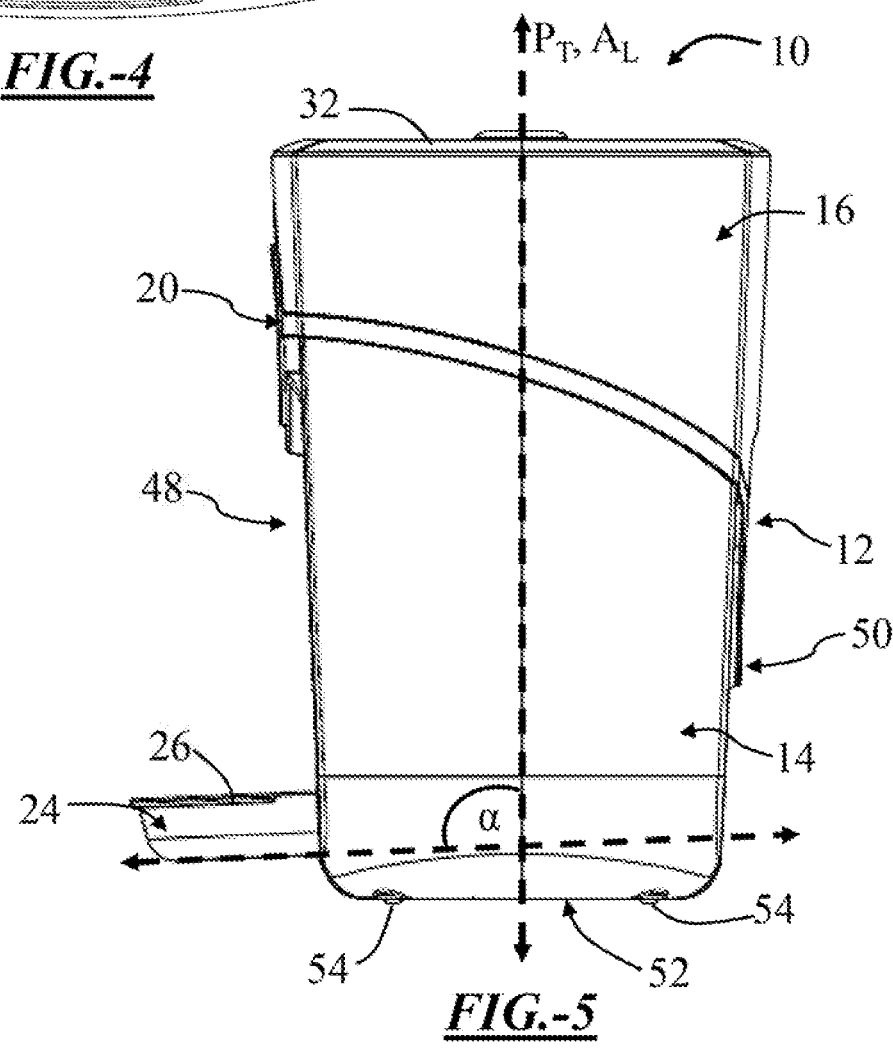
FIG. 5 is a side elevation view of a feeder according to the teachings herein.

FIG. 5 illustrates a side elevation view of a feeder 10. The feeder 10 includes a housing 12. The housing 12 includes a base portion 14, intermediate portion 20, and chamber portion 16. The base portion 14 includes a bottom 52. Projecting from the bottom 52 are a plurality of feet 54. Opposite the bottom 52 is a cover 32. Extending along a length of the feeder 10, from the bottom 52 to the cover 32 is a longitudinal axis $A_L$. The longitudinal axis $A_L$ is located between a front 48 and a rear 50 of the feeder 10. A serving area 24 projects beyond the housing 12 at the front 48. The serving area 24 includes a feeding dish 26. The serving area 24 and feeding dish 26 are tilted at an angle α relative to the longitudinal axis $A_L$ and transverse plane $P_T$. The angle α may allow for food 94 (not shown) to move toward the front 48 of the feeder 10.

FIG. 6 illustrates a rear elevation view of a feeder 10. The feeder 10 includes a housing 12. The housing 12 includes a base portion 14, intermediate portion 20, and chamber portion 16. The chamber portion 16 includes a hopper 18 and a cover 32. The intermediate portion includes a dispenser cradle 60. The hopper 18 includes a dispenser cover 122.

FIG. 7 illustrates a front elevation view of a feeder 10. The feeder 10 includes a housing 12. The housing 12 is substantially symmetrical about a median plane $P_M$. The median plane $P_M$ is parallel to and includes the longitudinal axis $A_L$ lying therein. The feeder 10 includes a base portion 14, an intermediate portion 20, and a chamber portion 16. The chamber portion 16 includes a hopper 18. The intermediate portion 20 is located between the chamber portion 16 and the base portion 14. On the front 48 of the feeder 10 is a control panel 40. The control panel 40 includes a selection interface 42 and status indicators 44. A feeding cavity 22 is formed within the base portion 14. The feeding cavity 22 is the cavity formed between the intermediate portion 20 and the base portion 14. The bottom of the feeding cavity 22 is defined by the serving area 24. Angled toward the serving area 24 from the rear 50 (not shown) is a chute 28 having a chute opening 30.

Figure 8:
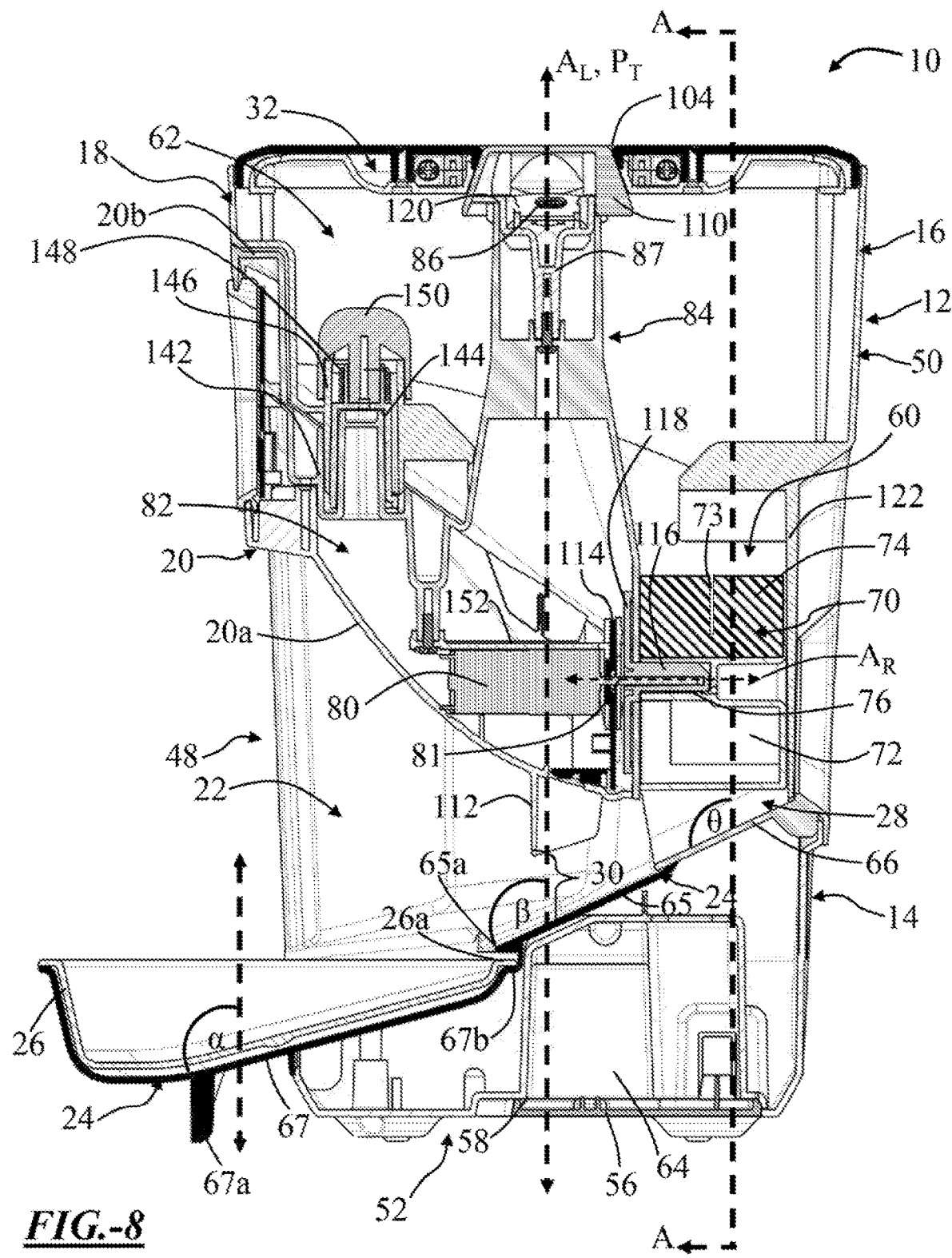
FIG. 8 is a cross-sectional view of a feeder along section B-B of FIG. 7.

FIG. 8 illustrates a cross-section of feeder 10 taken along section B-B of FIG. 7. The feeder 10 includes a housing 12. The housing 12 includes a base portion 14. The base portion 14 includes a bottom opening 58 covered by a bottom cap 56. The bottom opening 58 provides access to a base receptacle 64. The base receptacle 64 is formed as a depression in the base portion 14 extending upward toward the chamber portion 16. Located above the base receptacle 64 is a portion of the serving area 24. The serving area includes an angled, serving wall 65. The serving wall 65 is tilted at an angle β relative to the longitudinal axis $A_L$ and a transverse plane $P_T$. The transverse plane $P_T$ is generally parallel to and includes the longitudinal axis $A_L$ lying therein. The serving wall 65 is angled toward the front 48 of the feeder 10. The serving wall 65 is angled toward the bottom 52 of the housing 12. The serving wall 65 is sloped toward an outer dish 67 of the serving area 24. The serving wall 65 extends to have an integrated end 65a. The integrated end 65a extends over the outer dish 67, a portion of the feeding dish 26, or both. The integrated end 65a is connected and integral with an integrated lip 67b. The outer dish 67 includes an integrated lip 67b. The integrated lip 67b connects the outer dish 67 to the serving wall 65. The integrated lip 67b is overlapped by the serving wall 65, including the integrated end 65a. The overlap allows for the food to travel from the serving wall 65 into a serving dish 26. The integrated lip 67b receives a dish lip 26a of a feeding dish 26. The dish lip 26a rests between a gap formed by the integrated end 65a and the integrated lip 67b. Located within the outer dish 67 is the feeding dish 26. The outer dish 67 and feeding dish 26 are tilted at an angle α toward the front 48 of the feeder 10. The serving area 24 also includes a support 67a. The support 67a is integral with the outer dish 67. The support 67a extends downward substantially parallel to the longitudinal axis $A_L$ and transverse plane $P_T$. Formed between the serving area 24 and the intermediate portion 20 is the feeding cavity 22. Extending downward toward the serving area 24 is a chute 28. The chute 28 includes a chute wall 66. The chute wall 66 is tilted at an angle θ relative to a plane parallel to the transverse plane $P_T$. The chute wall 66 is tilted toward the front 48, the serving area 24, and the bottom 52. A chute opening 30 is formed between a control wall 112 and a serving wall 65. The chute 28 is formed as part of the intermediate portion 20.

The intermediate portion 20 includes a lower shell 20a and an upper shell 20b. The lower shell 20a includes a control wall 112. The control wall 112 projects downward toward the serving area 24, including the serving wall 65. The control wall 112 projects downward toward the bottom 52. The control wall 112 is substantially parallel with a longitudinal axis $A_L$ of the feeder 10. The sensing tower 84 is part of the upper shell 20b. The sensing tower 84 is generally centered with (e.g., coaxial) with the longitudinal axis $A_L$ of the feeder 10. The sensing tower 84 extends through the hollow interior 62 of the hopper 18 and opening 104 of the cover 32. The sensing tower 84 includes a cap 110. The sensing tower 84 houses one or more sensing devices 86. The one or more sensing devices 86 may be supported by a sensor bracket 87. The sensor bracket 87 may be located within and affixed to an interior of the sensing tower 84. The one or more sensing devices 86 are located at an upper end 120 of the sensing tower 84. The one or more sensing devices 86 may be located outside of and exposed from a hollow interior of the sensing tower 84. The one or more sensing devices 86 may be configured to sense the presence, distance, and/or quantity of food 94 (not shown) within the hollow interior 62 of the hopper 18.

The feeder 10 includes a lock 144. The lock 144 may function to stabilize the hopper 18 relative to the base 14. The lock 144 may also allow for the hopper 18 to remain in place relative to the remainder of the housing 12 during a movement of the feeder, a dispensing cycle, eating by an animal, or even if the feeder 10 is knocked over or moved by an animal or human. By affixing the hopper 18 with a lock 144, the feeder 10 is able to be lifted by the hopper 18 while remaining affixed to the remainder of the feeder 10 components. The bottom wall 68b includes a lock channel 146. The lock channel 146 aligns with a lower lock channel 142. The lower lock channel 142 is formed in the intermediate portion 20. The lower lock channel 142 is formed in the upper shell 20b. A lock 144 is located within the lock channels 142, 146. The lock 144 is held in place by a lock cap 150. Located between the cap 150 and the lock 144 is a bias device 148. The bias device 148 may be a helical spring. The bias device 148 may also be located between the cap 150 and the lock channel 146.

A mechanism cavity 82 is formed between the lower shell 20a and the upper shell 20b. Located within the mechanism cavity 82 is a drive source 80. The drive source 80 is affixed to a motor bracket 152. The motor bracket 152 may be affixed to the upper shell 20b. The drive source 80 may be a motor. The drive source 80 includes a drive shaft 81. The drive shaft 81 extends through a control board 114. The drive shaft 81 extends into an adapter shaft 116. The adapter shaft 116 includes a disc surface 118. The disc surface 118 is located adjacent to the control board 114. The drive shaft 81 and the adapter shaft 116 extend into the dispenser housing 60. The dispenser housing 60 is enclosed by a dispenser cover 122. Within the dispenser housing 60 is a dispenser 70. The dispenser includes a rocker body 72 having a fin 74 affixed thereto. The fin 74 includes a slit 73 formed therein. A shaft cavity 76 is defined within the rocker body 72. The drive shaft 81 and adapter shaft 116 are located within the shaft cavity 76. The adapter shaft 116 is rotationally engaged with the rocker body 72. Rotation of the adapter shaft 116 results in rotation of the rocker body 72 and fin 74 about the rotational axis $A_R$.

Figure 9:
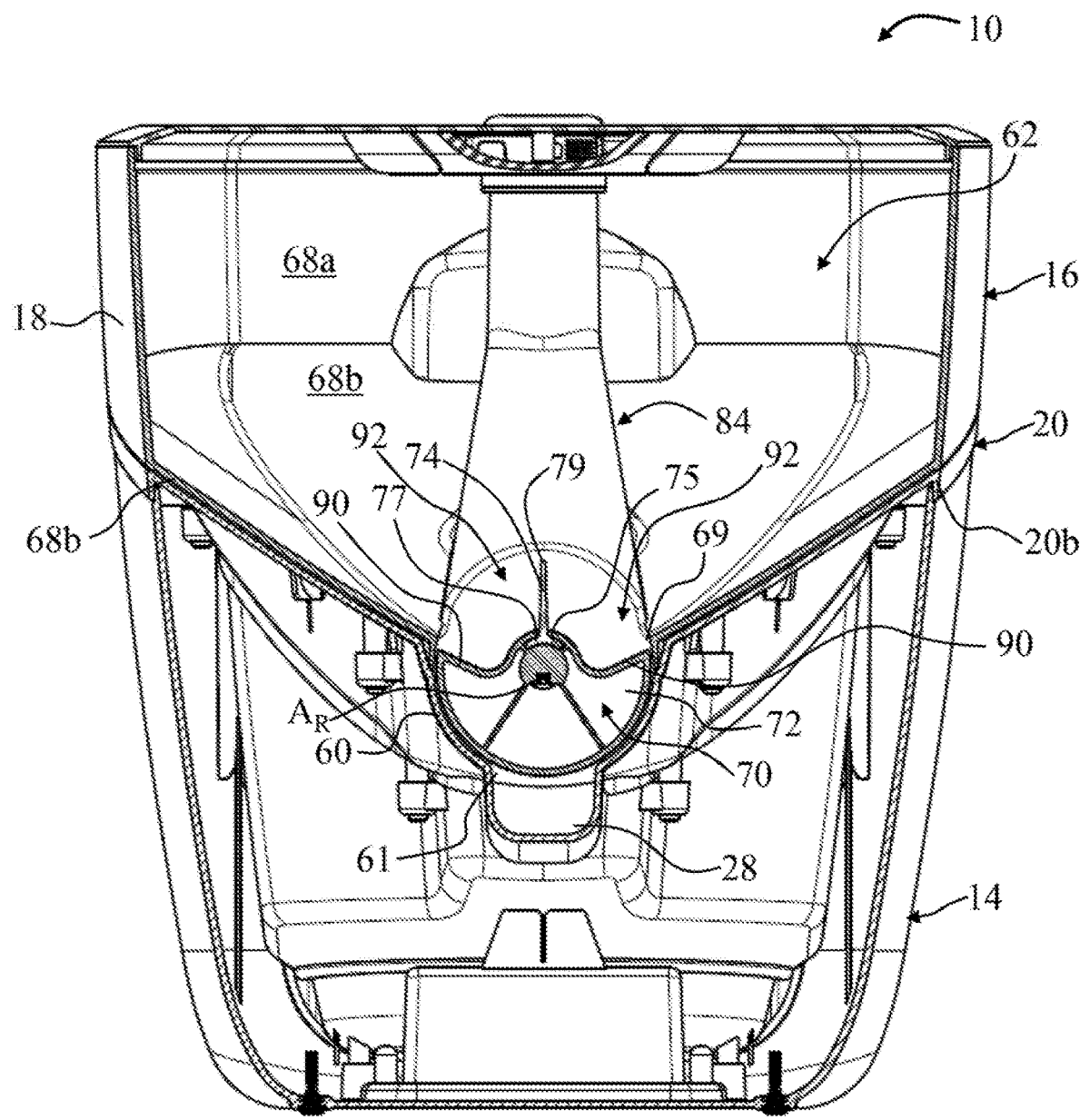
FIG. 9 is a cross-sectional view of a feeder along section A-A of FIG. 8.

FIG. 9 illustrates a cross-section of a feeder 10 along section A-A of FIG. 8. The feeder 10 includes a base portion 14, intermediate portion 20, and chamber portion 16. The chamber portion 16 includes a hopper 18. The hopper 18 includes a side wall 68a and a bottom wall 68b. The bottom wall 68b is tapered toward a sensing tower 84. The bottom wall 68b is further tapered toward a dispenser 70. The bottom wall 68b of the hopper 18 rests atop an upper shell 20b of the intermediate portion 20. The bottom wall 68b includes a hopper opening 69. The hopper opening 69 allows for the hollow interior 62 of the hopper 18 to be in communication with the dispenser cradle 60 and the dispenser 70. The upper shell 20b includes the dispenser cradle 60 formed therein. The dispenser cradle 60 has a substantially c-shaped profile (e.g., 2D cross-section). The dispenser cradle 60 has a profile substantially reciprocal with a portion of the dispenser 70. The dispenser cradle 60 has a profile substantially reciprocal with a rocker body 72 of the dispenser 70. The dispenser cradle 60 includes a cradle outlet 61. The cradle outlet 61 allows for the dispenser cradle 60 to be in communication with the chute 28. Within the dispenser cradle 60 is the dispenser 70. The dispenser includes a rocker body 72. The rocker body 72 includes a rotational axis $A_R$. The rocker body 72 includes a fin channel 75 therein. Located within the fin channel 75 is an attached end 77 of the fin 74. The attached end 77 is opposite a free end 79. The fin 74 is located between serving walls 90 of the rocker body 72. The distance between each serving wall 90 and the fin 74 forms a serving cavity 92.

Figure 10A:
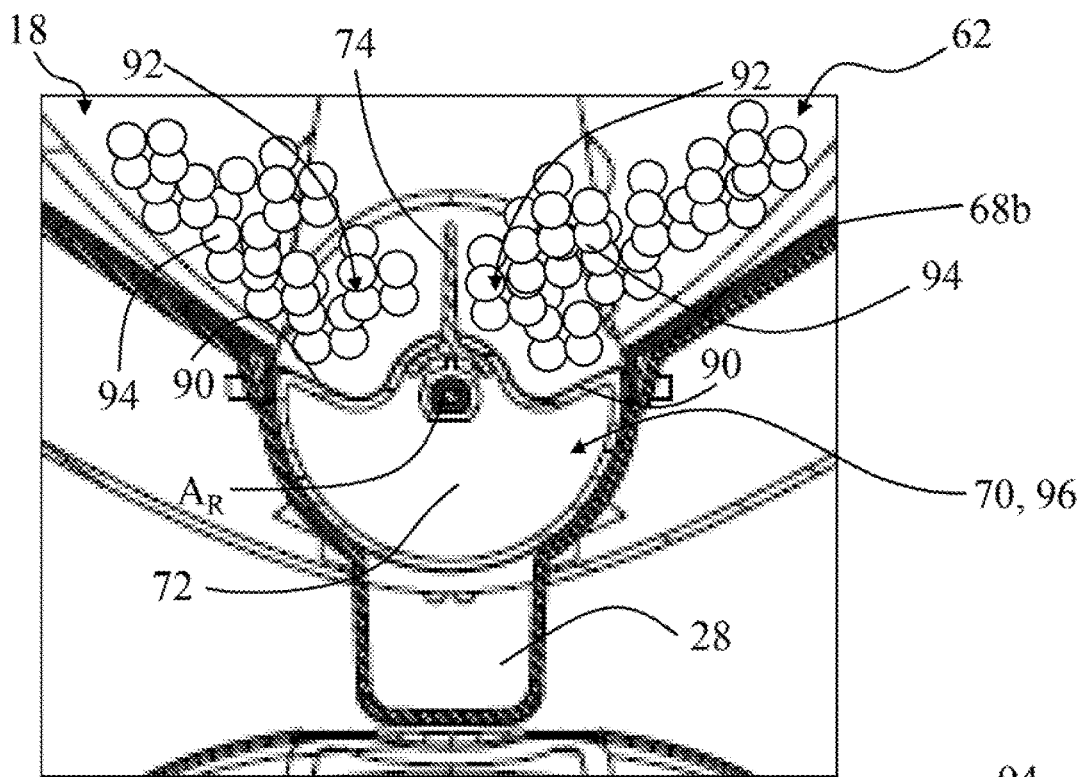
FIG. 10A is a dispenser of a feeder in a resting position according to the teachings herein.
Figure 10B:
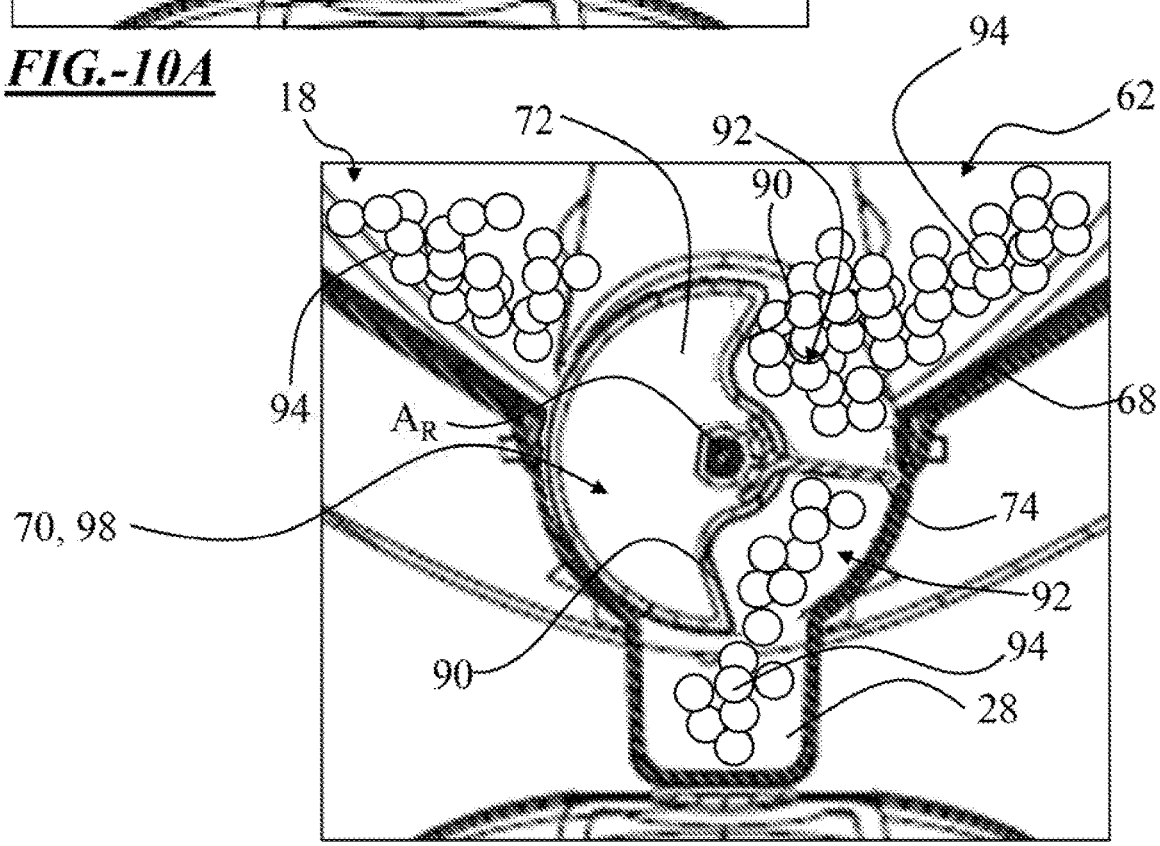
FIG. 10B is a dispenser of a feeder in a dispensing position according to the teachings herein.

FIGS. 10A-10B illustrate movement of a dispenser 70 from a resting position 96 (as shown in FIG. 10A) to a dispensing position 98 (as shown in FIG. 10B). In the resting position 96, the fin 74 projects inward into the chamber interior 62. In the resting position 96, the fin 74 projects away from the chute 28. In the resting position 96, food 94 rests between the fin 74 and serving walls 90, such that the food 94 rests within the serving cavities 92. To transition between the resting position 96 to the dispensing position 98, the dispenser 70 rotates about a rotational axis $A_R$. Rotation of the fin 74 about the rotational axis $A_R$ results in segregation of a portion of food 94. The segregation of food 94 occurs as the fin 74 passes the bottom wall 68b of the hopper 18. The segregated portion of food 94 remains located within the serving cavity 92 as the dispenser 70 rotates into the dispensing position 98. In the dispensing position 98, the serving cavity 92 is in communication with the chute 28 such that the segregated portion of food 94 is transferred from the serving cavity 92 into the chute 28. In the dispensing position 98, the fin 74 blocks food 94 remaining with the chamber interior 62 from passing into the chute 28. To transition back to the resting position 96 from the dispensing position 98, the dispenser 70 rotates back in an opposing direction (e.g., as opposed to completing a full rotation about the rotational axis). The dispenser 70 may rotate to a dispensing position in an opposing direction (not shown). Such that the dispenser 70 rotates between a first dispensing position, back to a resting position, then to a second dispensing position, and then back to the resting position. The second dispensing position may be substantially mirrored to the first dispensing position.

Figure 11:
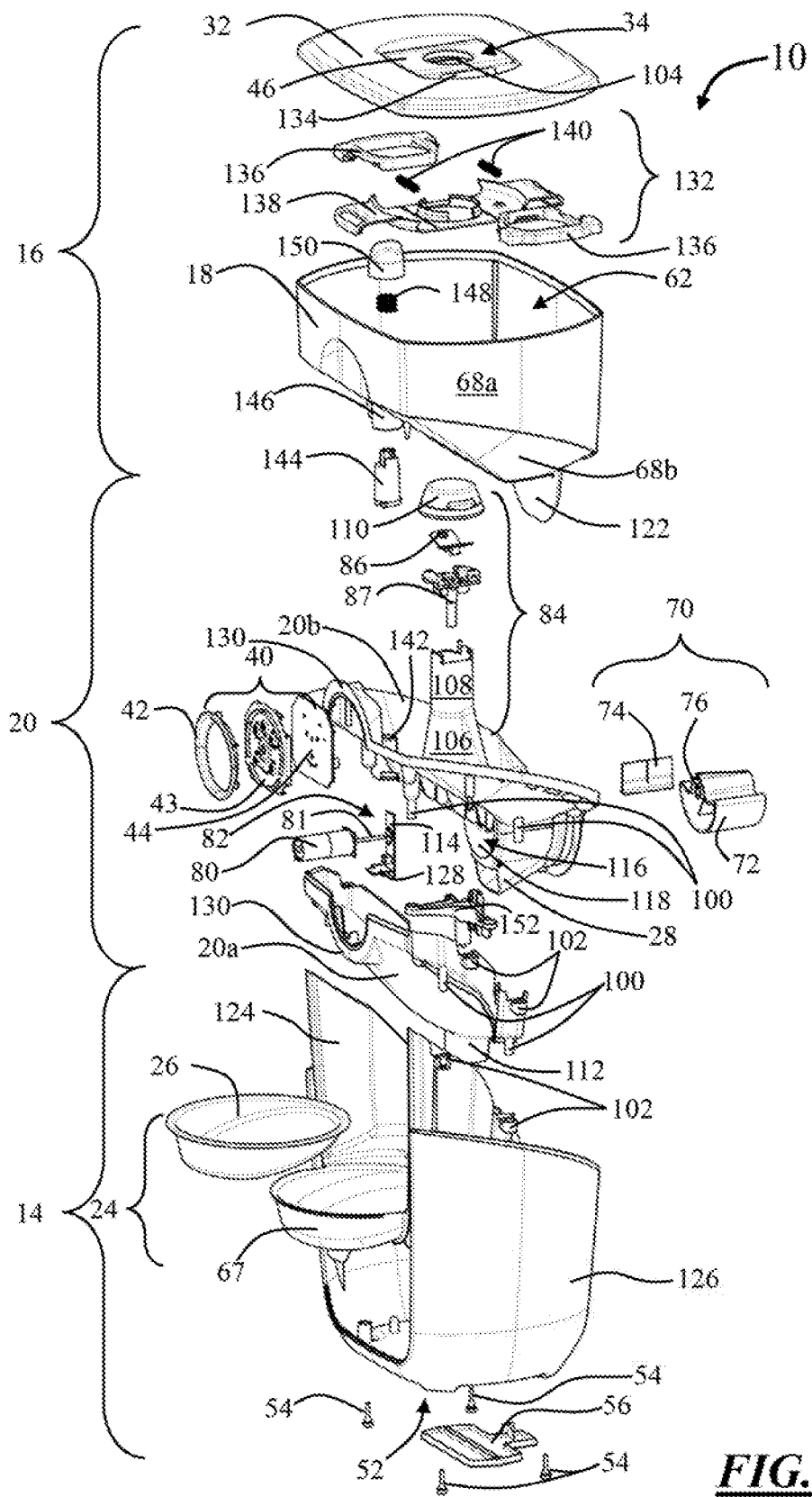
FIG. 11 is an exploded view of a feeder according to the teachings herein.

FIG. 11 illustrates an exploded view of the feeder 10. The feeder 10 includes a base portion 14. The base portion 14 has a serving area 24 located therein. The serving area 24 includes an outer dish 67. The outer dish 67 is adapted to receive a serving dish 26. The base portion 14 includes an inner shell 124 which locates within an outer shell 126. The base portion 14 includes a bottom cap 56. The bottom cap 56 is received within the bottom 52 of the feeder 10. The base portion 14 also receives a plurality of feet 54. The base portion 14 includes a plurality of sleeves 102. Each of the sleeves 102 is adapted to receive a post 100. The sleeves 102 of the base portion 14 receive posts 100 of the intermediate portion 20.

The intermediate portion 20 includes a lower shell 20a and an upper shell 20b. The lower shell 20a includes a control wall 112. The space between the upper shell 20b and the lower shell 20a defines a mechanism cavity 82 when assembled. A drive source 80 is located between the upper shell 20b and lower shell 20a. The drive source 80 is able to be held in place by a motor bracket 152. Extending from the drive source 80 is a drive shaft 81. The drive shaft 81 extends through a control board 114. The control board 114 includes one or more chute sensors 128. The drive shaft 81 extends into an adapter shaft 116. The adapter shaft 116 includes a disc surface 118. The adapter shaft 116 resides within a shaft cavity 76. The shaft cavity 76 is located within a rocker body 72. The rocker body 72 is part of a dispenser 70. The dispenser 70 also includes a fin 74. A rocker cap (not shown) may also be received within the shaft cavity 76 or the shaft cavity 76 may be closed at one end as part of the rocker body. The rocker cap may be located opposite the adapter shaft 116 relative to the rocker body 72. The upper shell 20b and lower shell 20a each include a portion of a control panel housing 130. Located within the control panel housing 130 is a control panel 40. The control panel 40 includes a selection interface 42, bezel 43, and status indicators 44. Projecting from the upper shell 20b is a sensing tower 84. The sensing tower 84 includes a conical portion 106 adjacent to a cylindrical portion 108. The sensing tower 84 includes a cap 110 which rests atop the cylindrical portion 108. The sensing tower 84 includes one or more sensing devices 86. The sensing device(s) 86 are located within or adjacent to a hollow interior of the sensing tower 84. The sensing device(s) 86 may be held in place by a sensor bracket 87. The sensor bracket 87 resides within a hollow interior of the sensing tower 84. The sensing tower 84 projects into a chamber portion 16.

The chamber portion 16 includes a hopper 18. The hopper 18 includes a side wall 68a and a bottom wall 68b. The bottom wall 68b includes a lock channel 146. The lock channel 146 aligns with a lower lock channel 142. The lower lock channel 142 is formed in the intermediate portion 20. The lower lock channel 142 is formed in the upper shell 20b. A lock 144 is located within the lock channels 142, 146. The lock 144 is held in place by a lock cap 150. Located between the cap 150 and the lock 144 is a bias device 148. The bias device 148 may be a helical spring. The bias device 148 may also be located between the cap 150 and the lock channel 146. The hopper 18 includes a hollow interior 62. The hopper 18 also includes a dispenser cover 122. A cover 32 rests on the hopper 18. The cover 32 includes a handle 34. The handle 34 includes a handle body 46 with an opening 104 therein. The handle 34 includes grip openings 134. The grip openings 134 allow for spring grips 136 to extend therethrough. The spring grips 136 are part of a cover lock 132. The spring grips 136 engage with springs 138. The springs 138 rest within a cover lock body 140.

Any numerical values recited in the above application include all values from the lower value to the upper value in increments of one unit provided that there is a separation of at least 2 units between any lower value and any higher value. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints.

The terms "generally", "substantially", and even "about" to describe angular measurements may mean about +/−10° or less, about +/−5° or less, or even about +/−1° or less. The terms "generally", "substantially", and even "about" to describe angular measurements may mean about +/−0.01° or greater, about +/−0.1° or greater, or even about +/−0.5° or greater. The terms "generally", "substantially", or even "about" to describe linear measurements, percentages, or ratios may mean about +/−10% or less, about +/−5% or less, or even about +/−1% or less. The terms "generally", "substantially", or even "about" to describe linear measurements, percentages, or ratios may mean about +/−0.01% or greater, about +/−0.1% or greater, or even about +/−0.5% or greater.

The term "consisting essentially of" to describe a combination shall include the elements, ingredients, components, or steps identified, and such other elements ingredients, components, or steps that do not materially affect the basic and novel characteristics of the combination. The use of the terms "comprising" or "including" to describe combinations of elements, ingredients, components, or steps herein also contemplates embodiments that consist essentially of the elements, ingredients, components, or steps.

Plural elements, ingredients, components, or steps can be provided by a single integrated element, ingredient, component, or step. Alternatively, a single integrated element, ingredient, component, or step might be divided into separate plural elements, ingredients, components, or steps. The disclosure of "a" or "one" to describe an element, ingredient, component, or step is not intended to foreclose additional elements, ingredients, components, or steps.

What is claimed is:

1. A feeder comprising:
a) a base portion having a serving area,
b) a chamber portion supported by the base portion and configured to retain a granular material within a chamber interior;
c) a dispenser configured to segregate a portion of the granular material from the chamber interior and transfer the portion of the granular material from the chamber portion to the serving area, wherein the dispenser includes:
   i) a rocker body configured to at least partially rotate about a rotational axis; and
   ii) one or more fins projecting from the rocker body, wherein a distance between the rocker body and the one or more fins is adapted to receive the portion of the granular material; and
d) a sensing tower which at least partially extends through the chamber portion and includes one or more sensing devices; and
wherein the one or more sensing devices are configured to sense a presence, a distance, and/or an amount of the granular material within the chamber portion.

2. The feeder of claim 1, wherein the chamber portion includes a hopper which is configured to retain the granular material and defines the chamber interior as a hollow interior.

3. The feeder of claim 2, wherein the hopper includes a bottom wall which is tapered and configured to channel the granular material toward the sensing tower, the dispenser, or both.

4. The feeder of claim 3, wherein the bottom wall is angled toward the sensing tower, the dispenser, or both.

5. The feeder of claim 3, wherein the sensing tower extends through the bottom wall and into the hollow interior of the hopper.

6. The feeder of claim 2, wherein a cover is removably affixed to the hopper.

7. The feeder of claim 6, wherein the sensing tower extends through the hopper from a bottom wall of the hopper to the cover.

8. The feeder of claim 6, wherein the cover receives and engages with a portion of the sensing tower.

9. The feeder of claim 8, wherein the cover is located opposite a bottom wall of the hopper.

10. The feeder of claim 6, wherein the cover is locked in place by one or more locks.

11. The feeder of claim 1, wherein the sensing tower is at least partially conical, prismed, or both such that it is wider toward a bottom wall of the chamber portion.

12. The feeder of claim 1, wherein the one or more sensing devices are affixed to an upper end of the sensing tower, wherein the upper end is located opposite a bottom wall of a hopper of the chamber portion.

13. The feeder of claim 12, wherein the one or more sensing devices are located adjacent to a cover of the feeder, wherein the cover closes the hopper.

14. The feeder of claim 1, wherein the one or more sensing devices have a line of sight into a majority or entirety of the chamber interior of the chamber portion.

15. The feeder of claim 1, wherein the one or more sensing devices include one or more mass sensors, capacitive sensors, infrared sensors, laser sensors, ultrasonic sensors, membrane sensors, radio frequency (RF) admittance sensors, conductive sensors, optical interface sensors, microwave sensors, or combination thereof.

16. The feeder of claim 1, wherein a chute is in communication with the chamber portion and the dispenser is located between the chute and the chamber portion.

17. The feeder of claim 16, wherein the feeder includes one or more chute sensing devices which are configured to sense a presence, a distance, and/or an amount of the granular material located within the serving area, the chute, or both.

18. A feeder comprising:
a) a base portion having a serving area;
b) a chamber portion supported by the base portion and configured to retain a granular material within a chamber interior;
c) a sensing tower which at least partially extends through the chamber portion and includes one or more sensing devices; and
wherein the one or more sensing devices are configured to sense a presence, a distance, and/or an amount of the granular material within the chamber portion.

19. The feeder of claim 18, wherein the chamber portion includes a hopper which is configured to retain the granular material and defines the chamber interior; and
wherein the sensing tower extends through an entire length of the hopper.

20. The feeder of claim 18, wherein the one or more sensing devices are located at or adjacent to an end of the sensing tower opposite the base portion.

\* \* \* \* \*